(12) United States Patent
Kunimatsu et al.

(10) Patent No.: US 8,458,436 B2
(45) Date of Patent: Jun. 4, 2013

(54) DEVICE AND MEMORY SYSTEM FOR MEMORY MANAGEMENT USING ACCESS FREQUENCY INFORMATION

(75) Inventors: Atsushi Kunimatsu, Chiba (JP); Hiroto Nakai, Yokohama (JP); Hiroyuki Sakamoto, Ome (JP); Kenichi Maeda, Kamakura (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/360,903

(22) Filed: Jan. 30, 2012

(65) Prior Publication Data

US 2012/0124290 A1    May 17, 2012

Related U.S. Application Data

(63) Continuation of application No. 12/236,880, filed on Sep. 24, 2008, now Pat. No. 8,135,900, which is a continuation-in-part of application No. 12/056,501, filed on Mar. 27, 2008, now Pat. No. 8,261,041.

(30) Foreign Application Priority Data

Mar. 28, 2007  (JP) ................................ 2007-084272

(51) Int. Cl.
*G06F 12/00*       (2006.01)
(52) U.S. Cl.
USPC ............ 711/203; 711/103; 711/118; 711/206
(58) Field of Classification Search
USPC ......................................................... 711/103
See application file for complete search history.

(56) References Cited

U.S. PATENT DOCUMENTS

| 6,000,006 | A  | 12/1999 | Bruce et al. |
| 6,456,517 | B2 | 9/2002  | Kim |
| 7,512,767 | B2 | 3/2009  | Ritzau et al. |
| 7,716,411 | B2 | 5/2010  | Panabaker et al. |
| 7,870,446 | B2 | 1/2011  | Kurashige |
| 7,948,798 | B1 | 5/2011  | Sheredy et al. |

(Continued)

FOREIGN PATENT DOCUMENTS

| JP | 07-146820   | 6/1995 |
| JP | 2001-266580 | 9/2001 |
| JP | 2002-073409 | 3/2002 |
| JP | 2005-235182 | 9/2005 |

OTHER PUBLICATIONS

Office Action for U.S. Appl. No. 12/236,880, mailed Jun. 14, 2011, 8 pgs.

(Continued)

*Primary Examiner* — John Lane
(74) *Attorney, Agent, or Firm* — Sprinkle IP Law Group

(57) ABSTRACT

An integrated memory management device according to an example of the invention comprises an acquiring unit acquiring a read destination logical address from a processor, an address conversion unit converting the read destination logical address into a read destination physical address of a non-volatile main memory, an access unit reading, from the non-volatile main memory, data that corresponds to the read destination physical address and has a size that is equal to a block size or an integer multiple of the page size of the non-volatile main memory, and transmission unit transferring the read data to a cache memory of the processor having a cache size that depends on the block size or the integer multiple of the page size of the non-volatile main memory.

6 Claims, 22 Drawing Sheets

U.S. PATENT DOCUMENTS

| | | | |
|---|---|---|---|
| 2007/0118688 | A1 | 5/2007 | Lee et al. |
| 2007/0204128 | A1 | 8/2007 | Lee et al. |
| 2007/0276988 | A1 | 11/2007 | Luo et al. |
| 2008/0140918 | A1 | 6/2008 | Sutardja |
| 2008/0147998 | A1 | 6/2008 | Jeong |
| 2008/0189452 | A1 | 8/2008 | Merry et al. |
| 2009/0055576 | A1 | 2/2009 | Nakanishi et al. |
| 2009/0150588 | A1 | 6/2009 | Wang et al. |
| 2011/0029723 | A1 | 2/2011 | Lee et al. |
| 2011/0219180 | A1* | 9/2011 | Cheon et al. .............. 711/103 |
| 2011/0246701 | A1 | 10/2011 | Kano et al. |
| 2012/0059978 | A1* | 3/2012 | Rosenband et al. ......... 711/103 |
| 2012/0311246 | A1* | 12/2012 | McWilliams et al. ........ 711/103 |

OTHER PUBLICATIONS

Office Action for U.S. Appl. No. 12/056,501, mailed Jun. 21, 2011, 8 pgs.

Office Action for Japanese Patent Application No. 2007-084272, dated Dec. 21, 2011, mailed Jan. 10, 2012, Japanese Patent Office, 5 pgs. (with English translation).

Notice of Allowance for U.S. Appl. No. 12/236,880, mailed Nov. 1, 2011, 12 pgs.

Corrected Notice of Allowability for U.S. Appl. No. 12/236,880, mailed, Dec. 9, 2011, 5 pgs.

* cited by examiner

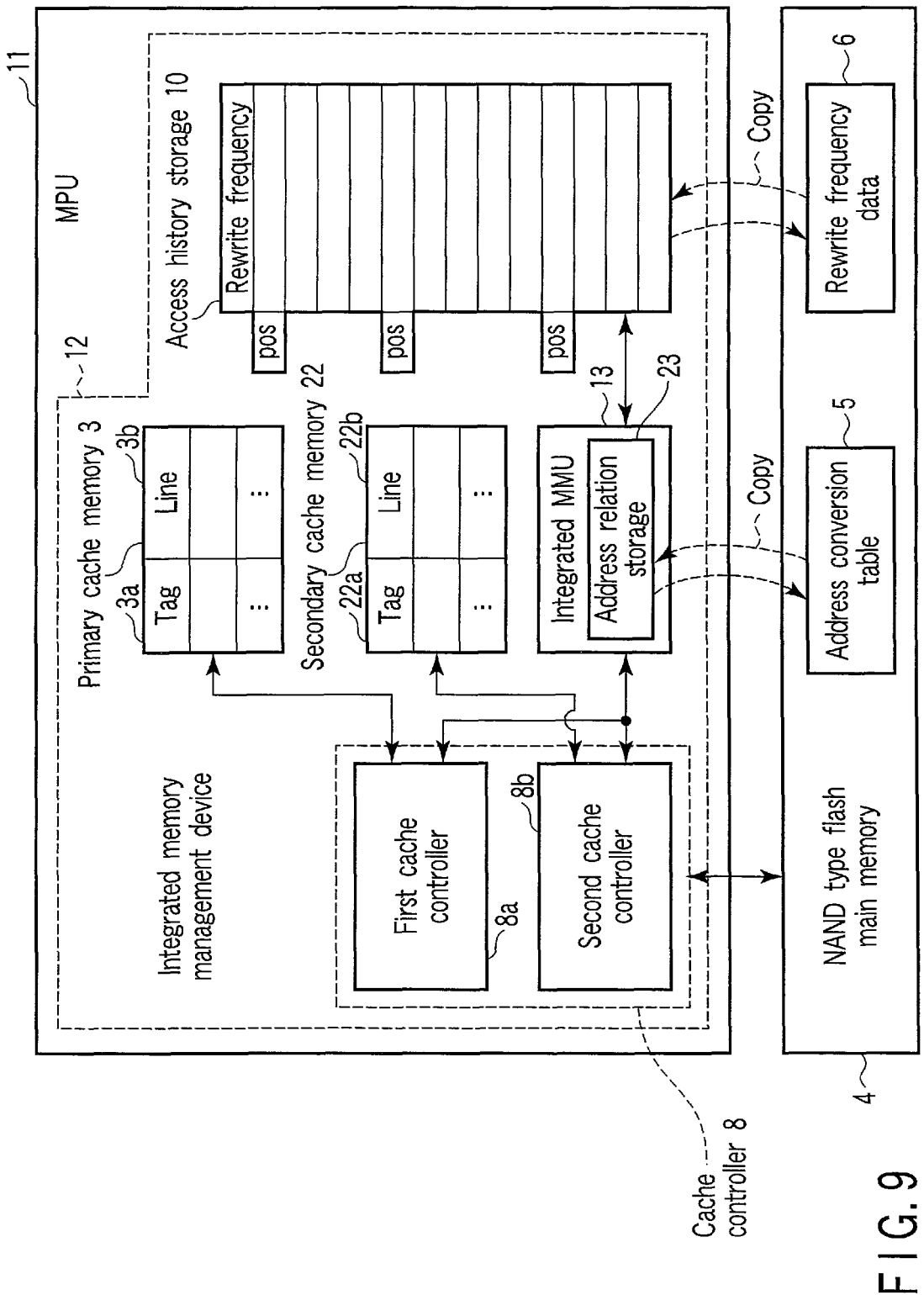
F I G. 9

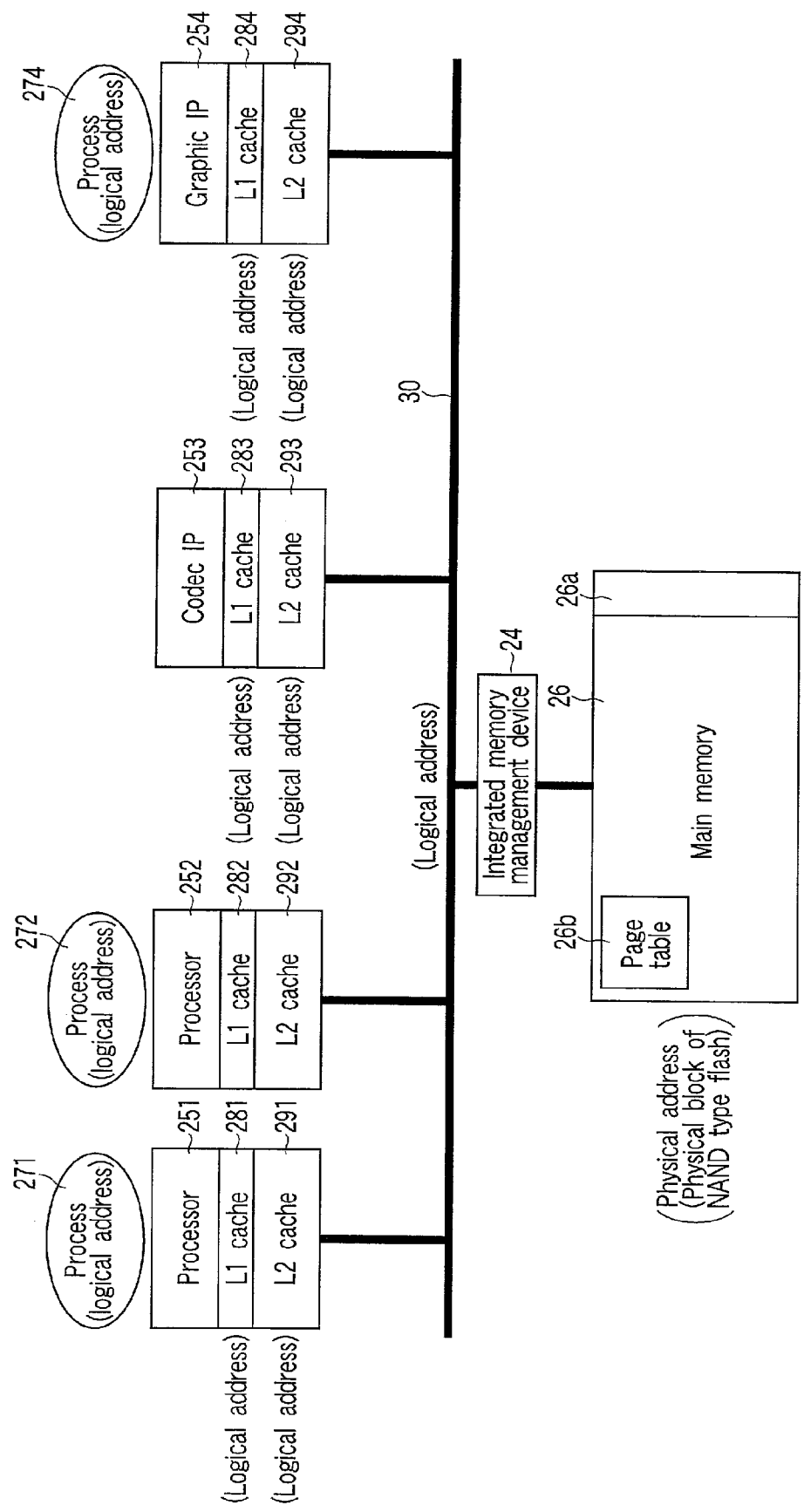
F I G. 11

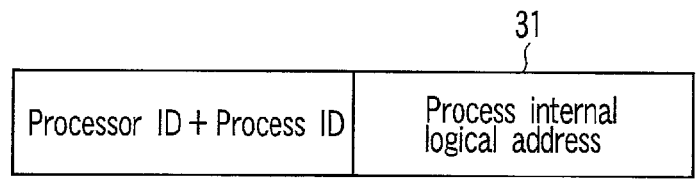
F I G. 12
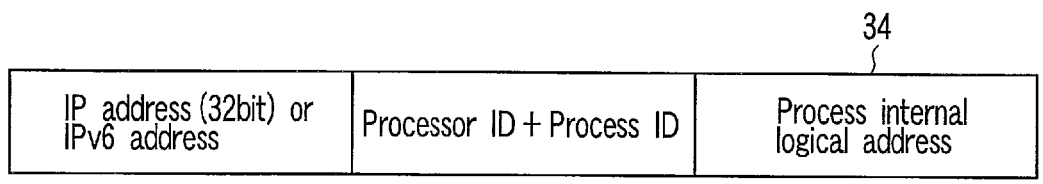
F I G. 14
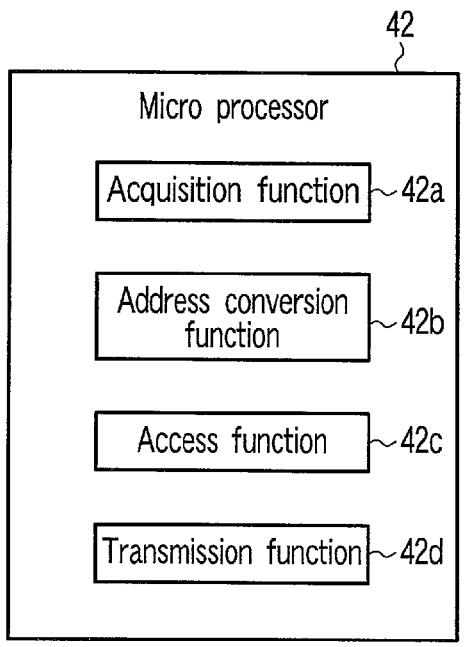
F I G. 17

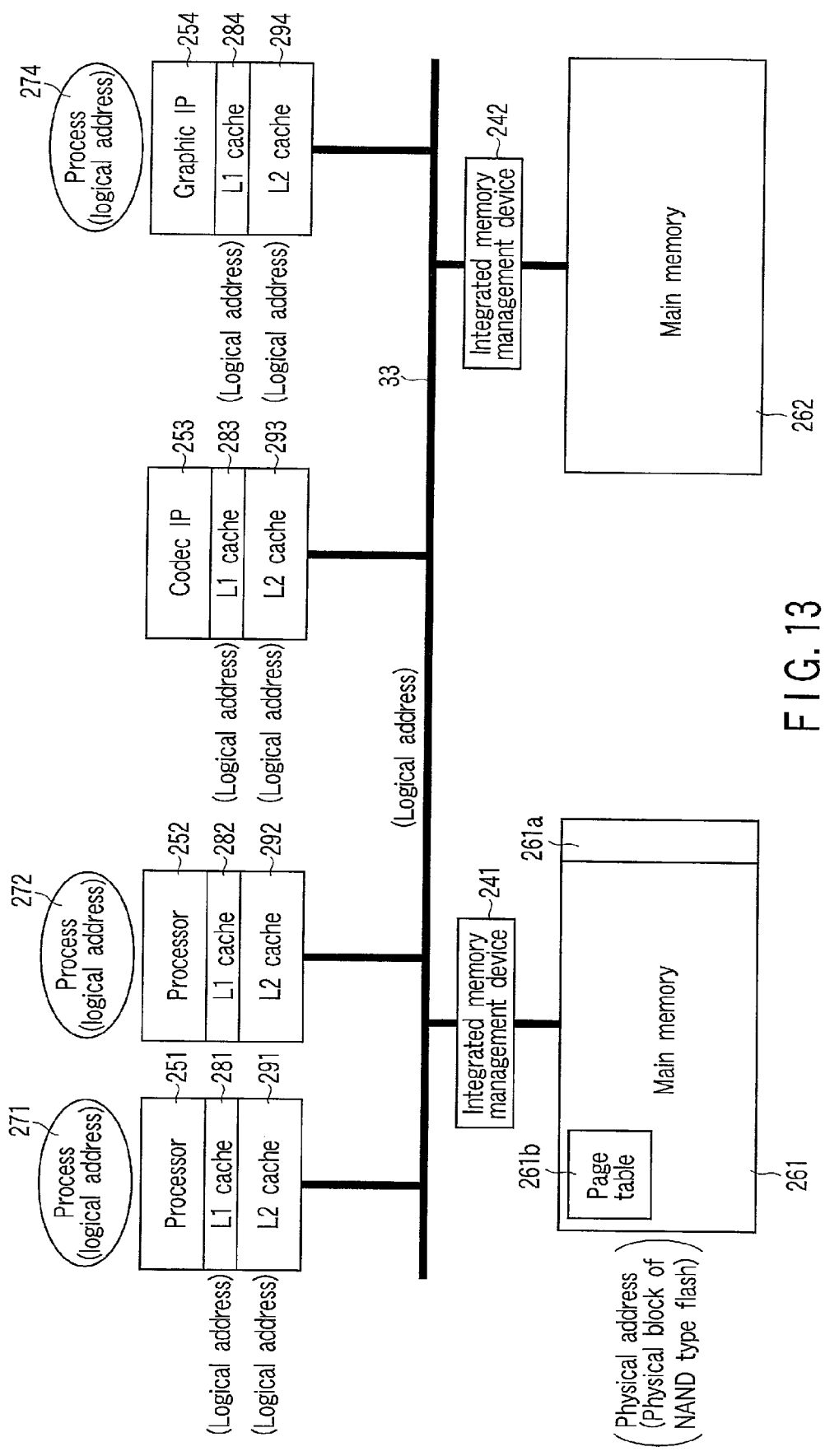
F I G. 13

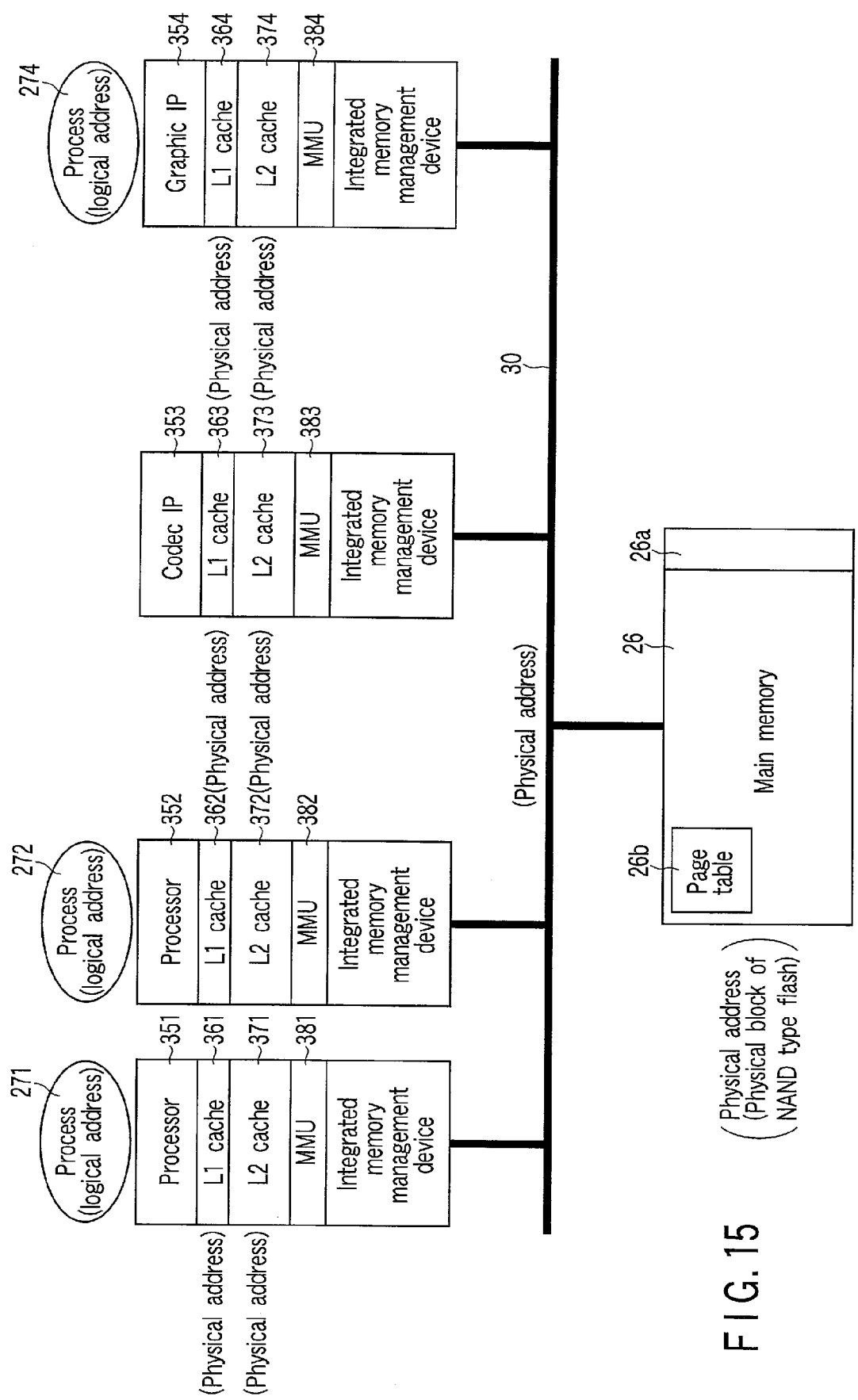
F I G. 15

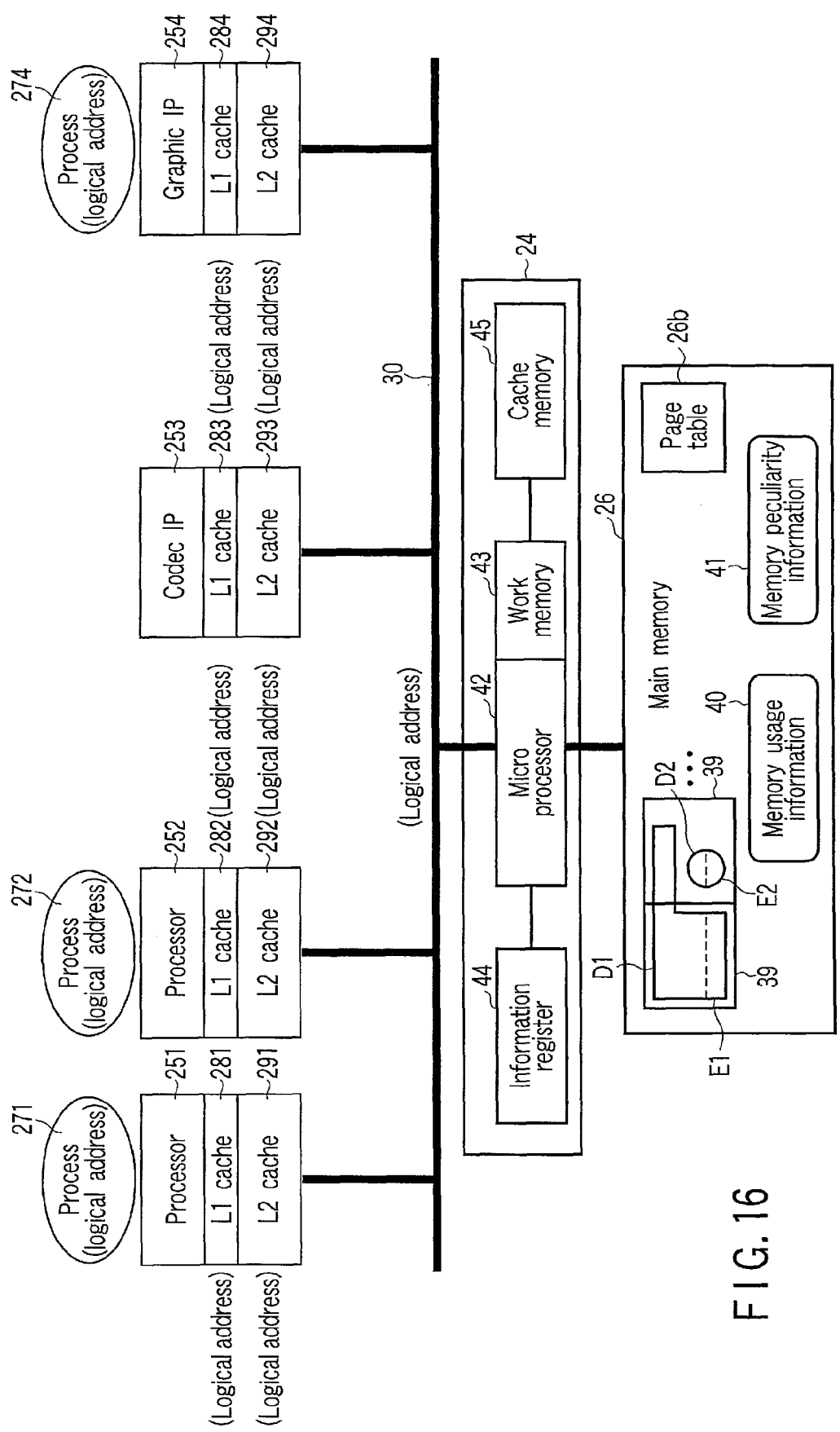
F I G. 16

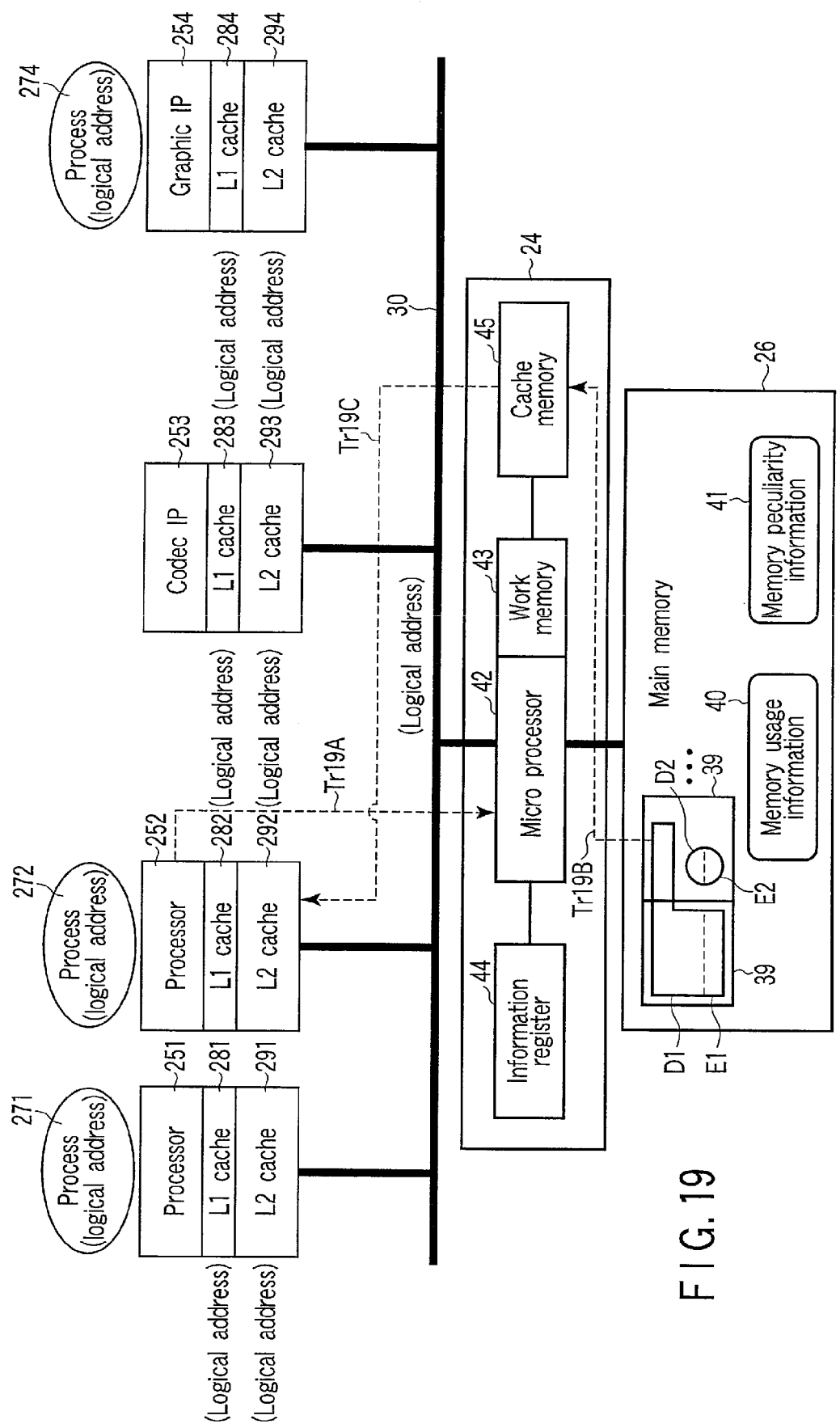
F I G. 19

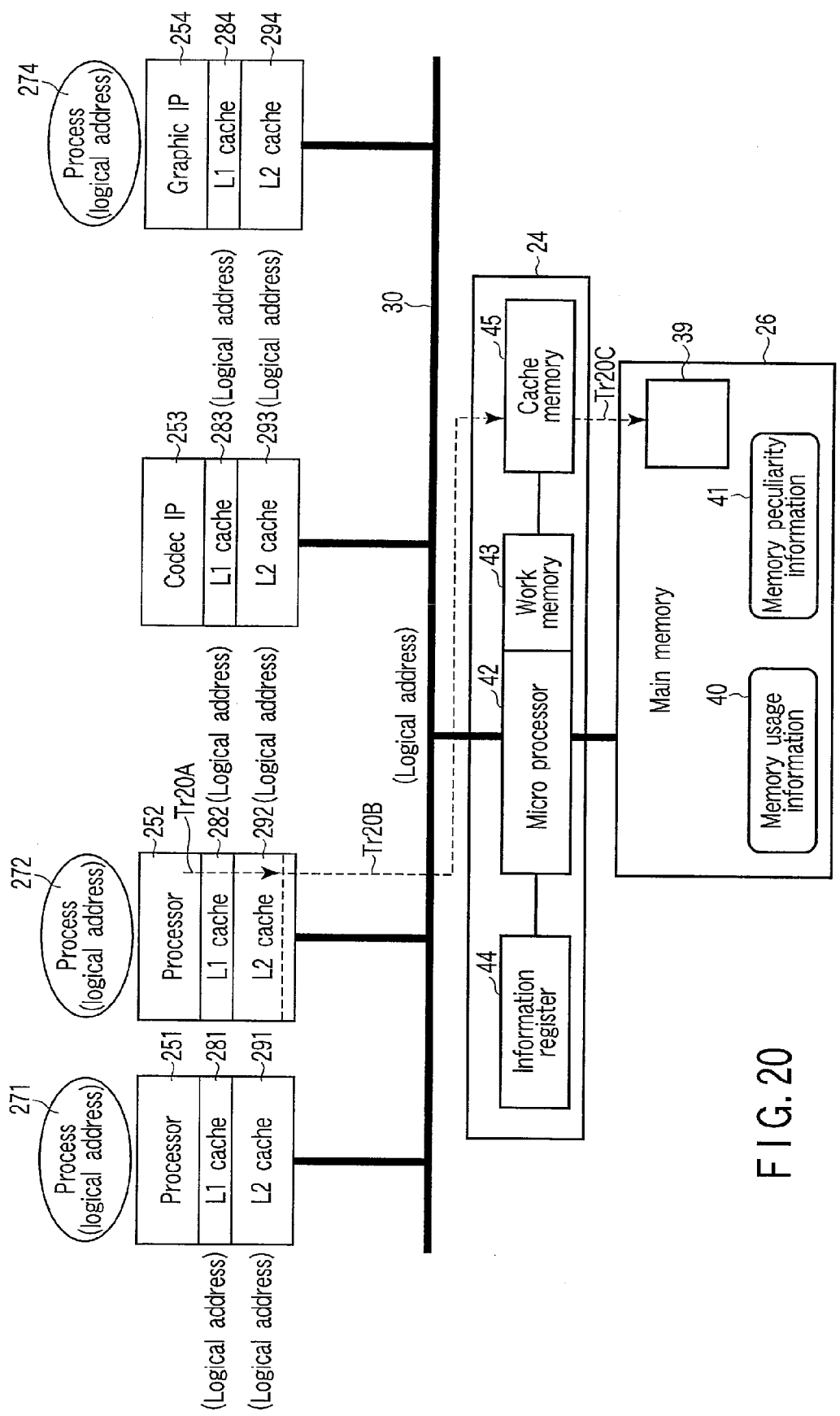
F I G. 20

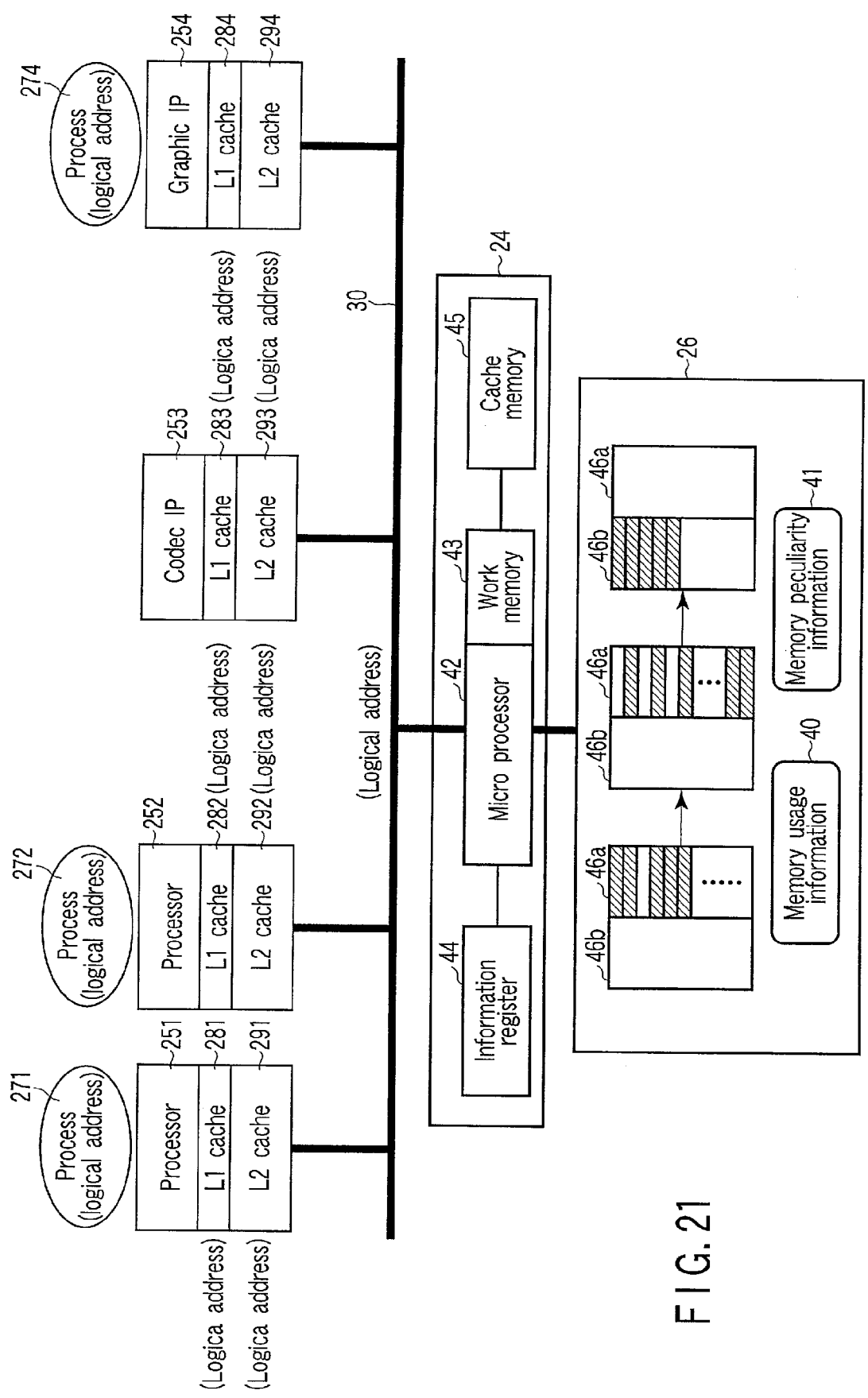
F I G. 21

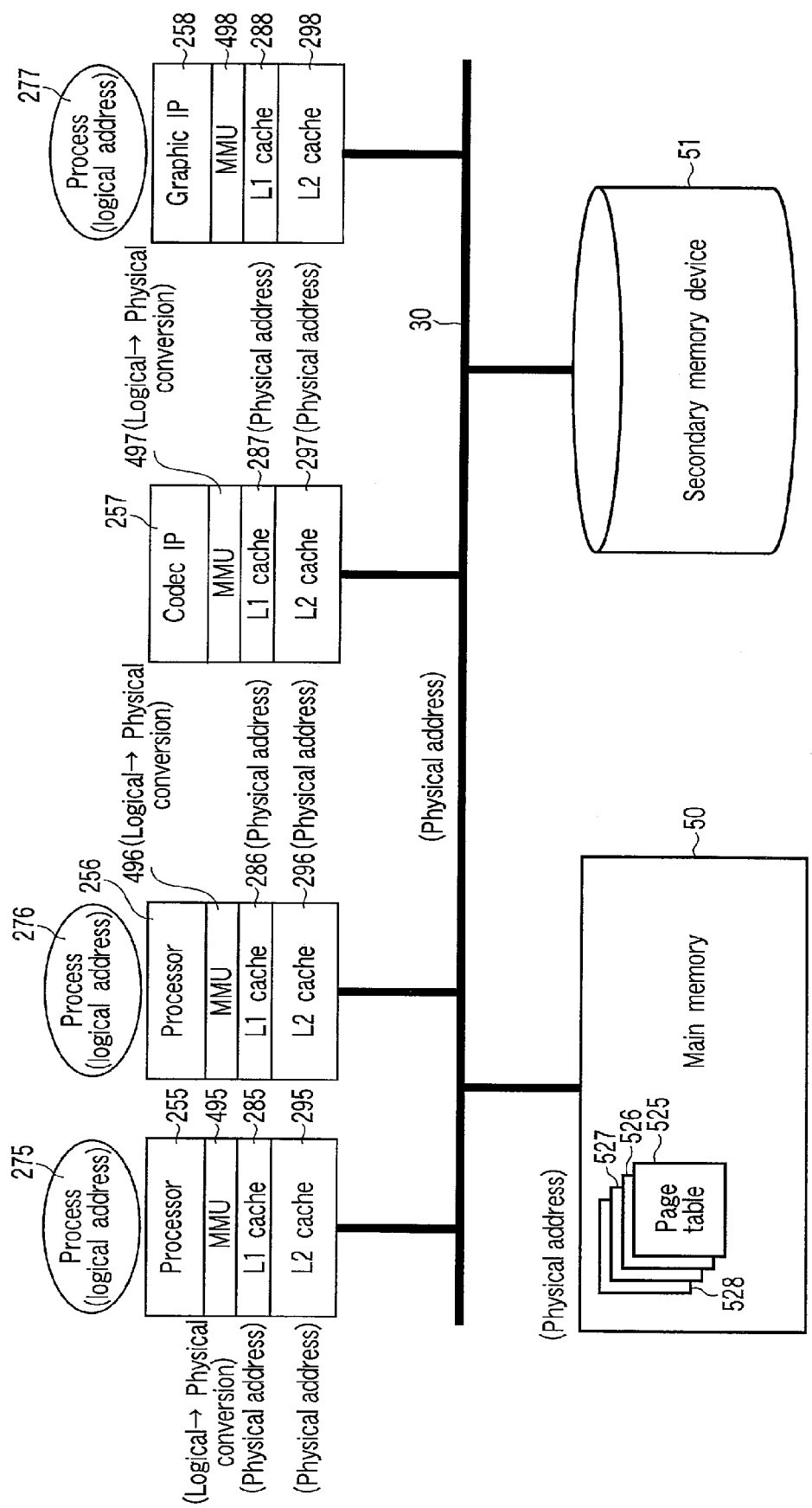
F I G. 24

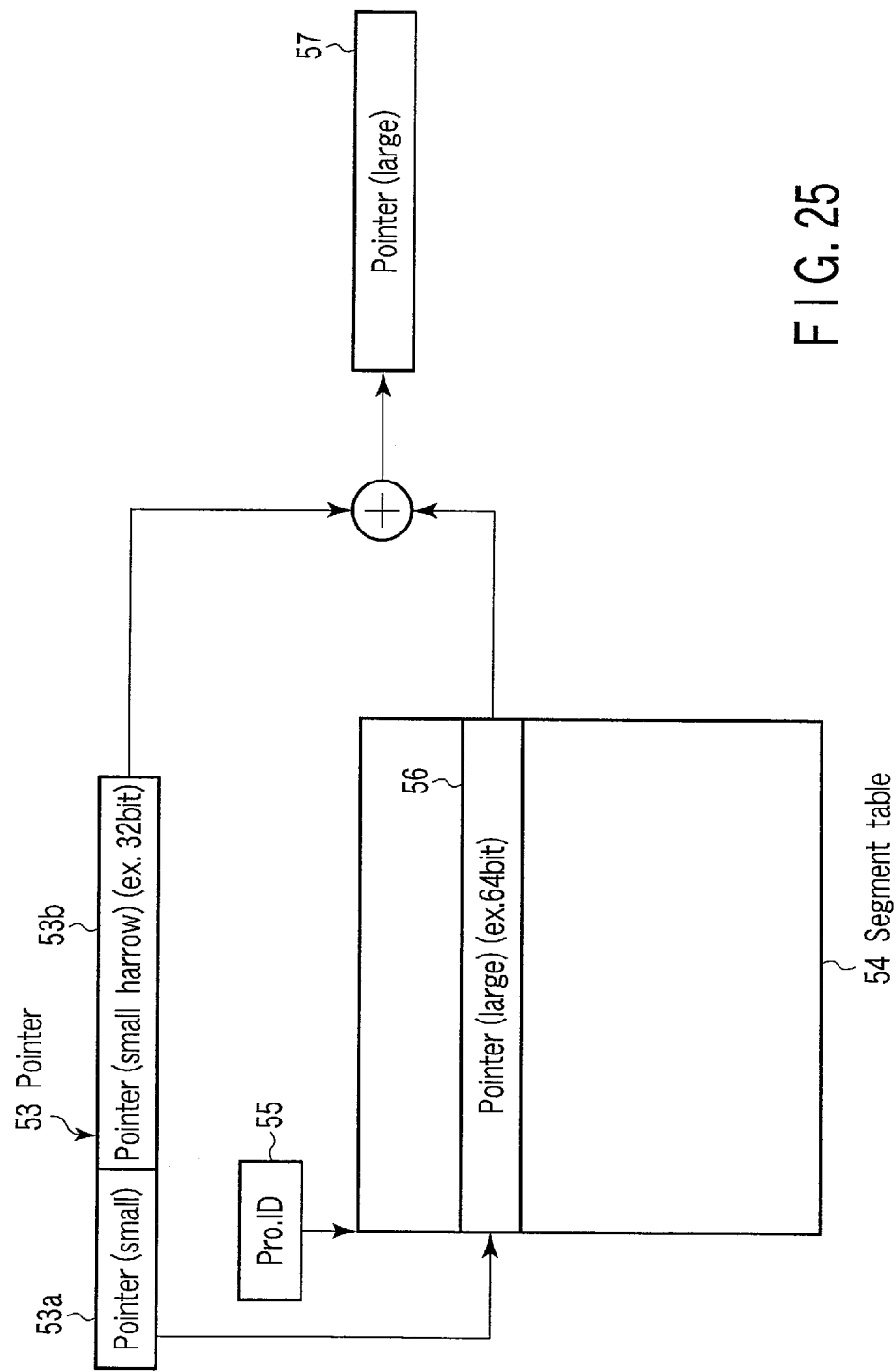
F I G. 25

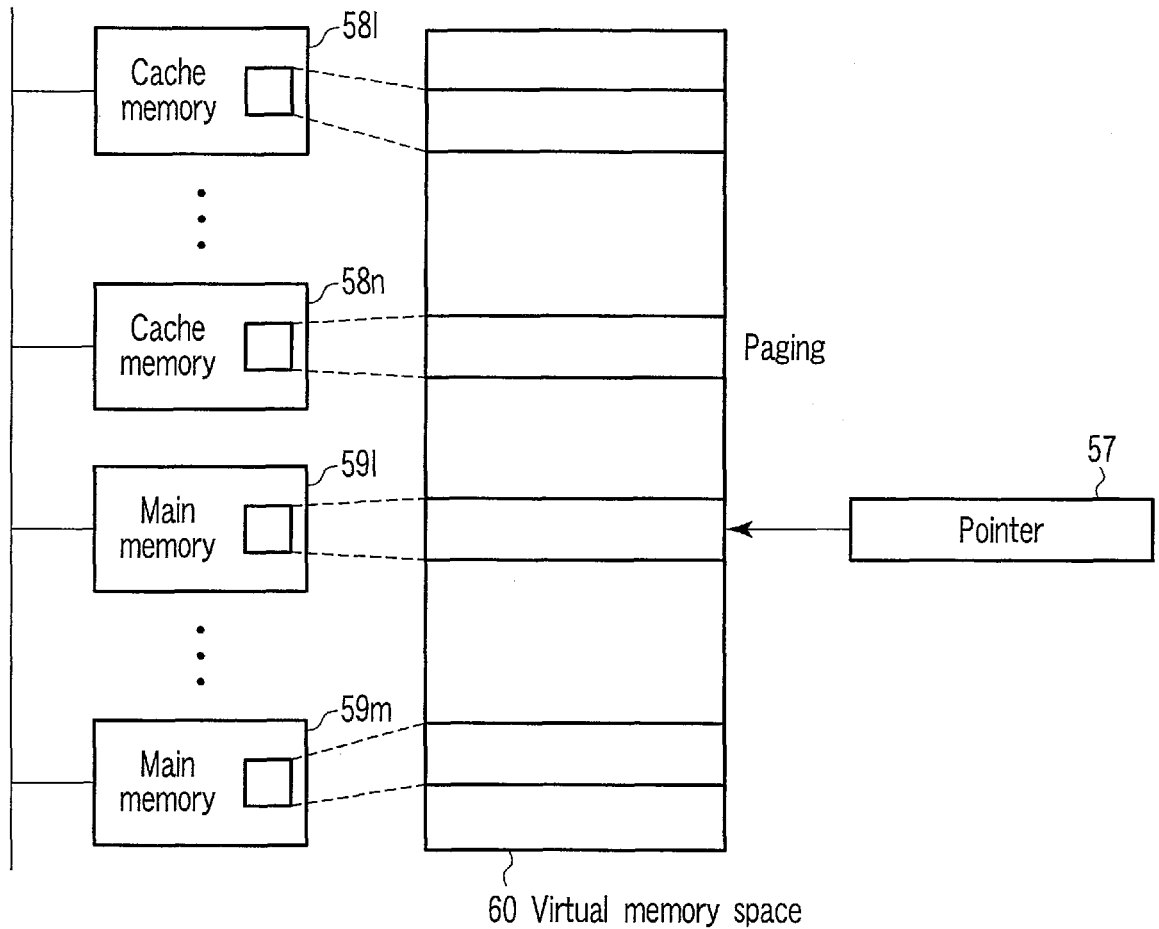
F I G. 26

DEVICE AND MEMORY SYSTEM FOR MEMORY MANAGEMENT USING ACCESS FREQUENCY INFORMATION

CROSS-REFERENCE TO RELATED APPLICATIONS

This is a Continuation application of U.S. patent application Ser. No. 12/236,880, filed Sep. 24, 2008, which is a Continuation-in-Part application of U.S. patent application Ser. No. 12/056,501, filed Mar. 27, 2008, the entire contents of which are incorporated herein by reference. This application is based upon and claims the benefit of priority from prior Japanese Patent Application No. 2007-084272, filed Mar. 28, 2007, the entire contents of which are incorporated herein by reference.

BACKGROUND OF THE INVENTION

1. Field of the Invention

The present invention relates to a device and memory management method for managing writing or reading with respect to a cache memory and a main memory.

2. Description of the Related Art

Conventionally, a management function of a NAND type flash memory is built into a file system.

A micro processing unit (MPU) is provided with a cache memory. A dynamic random access memory (DRAM) is used as a main memory. When the MPU accesses the NAND type flash memory, an operation is carried out according to the following memory hierarchy in the conventional case.

First, the MPU converts a logical address to a physical address using a memory management unit (MMU) to make an access to a cache memory.

In this case, the MPU accesses the main memory, that is, DRAM, with respect to partial data by virtual memory management of an operating system (OS).

If the MPU further has a need to access the NAND type flash memory, the MPU makes the following controls to determine a physical location of the NAND type flash memory by a Flash File System. One is a control for avoiding a defective block in NAND type flash memory. Another is a control for making accesses to all blocks of the NAND type flash memory almost equally (without difference).

The MPU accesses the NAND type flash memory based on the determined physical location.

The conventional MPU must execute many operations included in different hierarchy when the number of memory hierarchy is much. For this reason, it is difficult to effect optimization between different hierarchy operations. For example, the MPU makes a changeover of data of the cache memory. In this case, it is difficult to realize control of managing bad block peculiar to the NAND type flash memory because the control belongs to different operation memory hierarchy.

A document 1 (Jpn. Pat. Appln. KOKAI Publication No. 2001-266580) discloses an invention enable different kind of a semiconductor memory device to be connected to a common bus.

The semiconductor memory device disclosed in the document 1 includes a random access memory chip and a package having the random access memory chip. The package has a plurality of pins electrically connecting the random access memory chip to an external device. The pins provide a memory function in common to the random access memory chip and an electrically erasable and programmable non-volatile semiconductor memory. The pins are arrayed according to the corresponding pin position of the non-volatile semiconductor memory.

BRIEF SUMMARY OF THE INVENTION

An integrated memory management device according to the first example of the invention comprises an acquiring unit acquiring a read destination logical address from a first processor of one or more processors; an address conversion unit converting the read destination logical address acquired by the acquiring unit into a read destination physical address of a non-volatile main memory; an access unit reading, from the non-volatile main memory, data that corresponds to the read destination physical address and has a size that is equal to a block size of the non-volatile main memory or an integer multiple of the page size of the non-volatile main memory; and transmission unit transferring the read data to a cache memory of the first processor having a cache size that depends on the block size of the non-volatile main memory or the integer multiple of the page size of the non-volatile main memory.

A memory management method according to the second example of the invention comprises acquiring a read destination logical address from a first processor of one or more processors by an integrated memory management device; converting the read destination logical address acquired into a read destination physical address of a non-volatile main memory by the integrated memory management device; reading, from the non-volatile main memory, data that corresponds to the read destination physical address and has a size that is equal to a block size of the non-volatile main memory or an integer multiple of the page size of the non-volatile main memory by the integrated memory management device; and transferring the read data to a cache memory of the first processor having a cache size that depends on the block size of the non-volatile main memory or the integer multiple of the page size of the non-volatile main memory by the integrated memory management device.

BRIEF DESCRIPTION OF THE SEVERAL VIEWS OF THE DRAWING

FIG. 9 is a block diagram showing a second example of the integrated memory management device in accordance with the third embodiment;

FIG. 11 is a block diagram showing the configuration of an integrated memory management device according to a fifth embodiment of the present invention;

FIG. 12 is a block diagram showing the configuration of a system logical address according to the fifth embodiment;

FIG. 13 is a block diagram showing the configuration of an integrated memory management device according to a sixth embodiment of the present invention;

FIG. 14 is a block diagram showing the configuration of a system logical address according to the sixth embodiment;

FIG. 15 is a block diagram showing the configuration of an integrated memory management device according to a seventh embodiment of the present invention;

FIG. 16 is a block diagram illustrating an example of the structure of an integrated memory management device according to an eighth embodiment of the present invention;

FIG. 17 is a block diagram illustrating an example of the function of the microprocessor of the integrated memory management device according to the eighth embodiment;

FIG. 19 is a diagram illustrating an example of the second operation of the transmission algorithm of the integrated memory management device according to the eighth embodiment;

FIG. 20 is a diagram illustrating an example of the third operation of the transmission algorithm of the integrated memory management device according to the eighth embodiment;

FIG. 21 is a block diagram illustrating an example of a wear-leveling;

FIG. 24 is a block diagram illustrating an example of a general multi-processor system according to the related art;

FIG. 25 is a block diagram illustrating an example of a process of obtaining a pointer for a large address space; and FIG. 26 is a block diagram illustrating an example of a virtual memory space formed between a plurality of cache memories and a plurality of NAND type flash main memories.

DETAILED DESCRIPTION OF THE INVENTION

Figure 1:
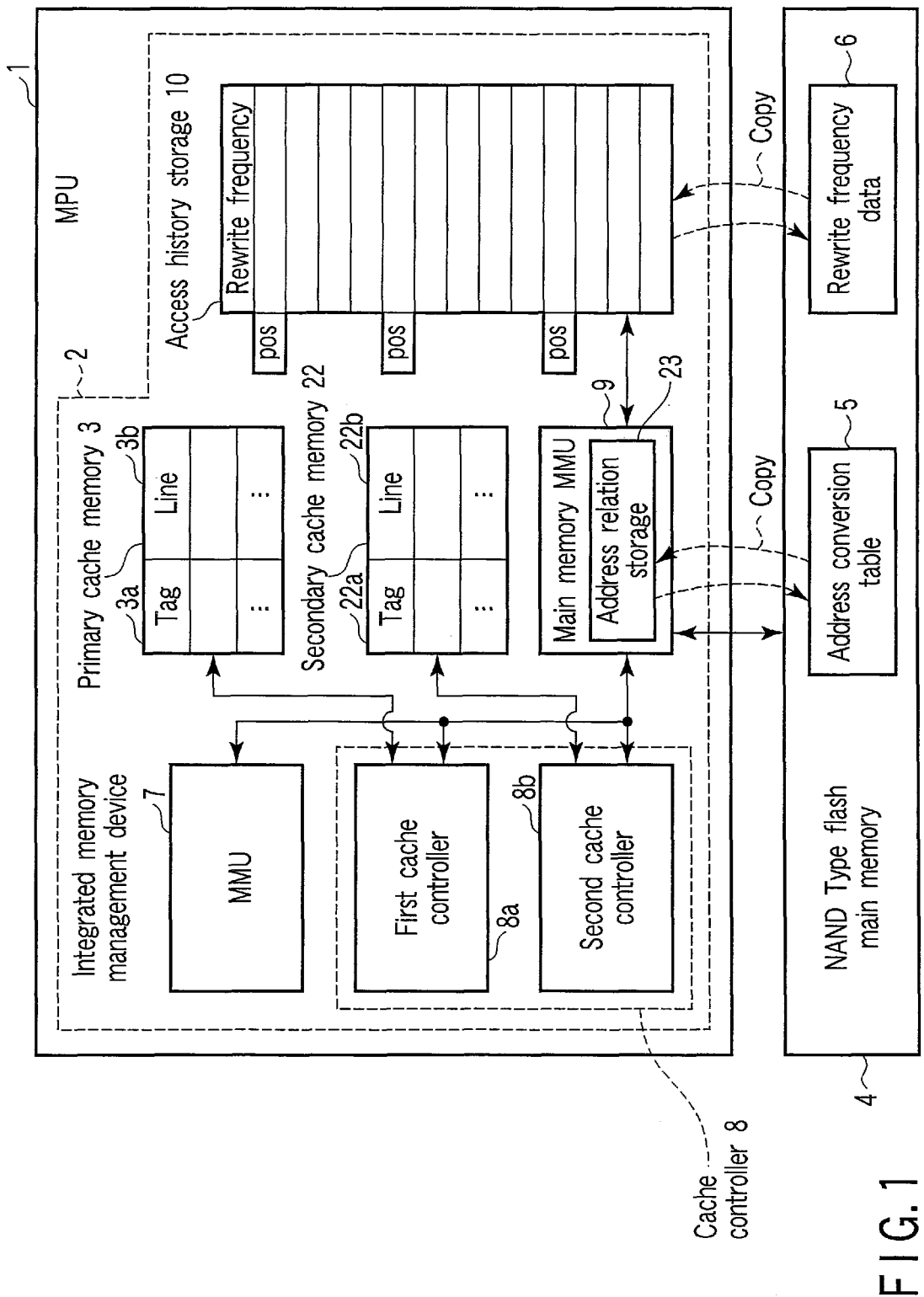
FIG. 1 is a block diagram showing an example of an integrated memory management device in accordance with the first embodiment of the present invention.

Various embodiments of the present invention will be hereinafter described with reference to the accompanying drawings. In the following description, the same reference numerals are used to designate the identical functions and components. The overlapping explanation will be made if necessary only.

(First Embodiment)

An integrated memory management device (flat memory management device) of this embodiment is included in a MPU. The integrated memory management device makes memory management with respect to a cache memory and a main memory. The integrated memory management device reduces the number of memory hierarchies related to memory access, and easily realizes optimization of memory access.

The first embodiment relates to the integrated memory management device, which are integrated with a MMU of MPU, a cache controller of MPU and a main memory MMU.

FIG. 1 is a block diagram showing an example of the integrated memory management device according to the first embodiment. This embodiment describes the case where a NAND type flash memory is used as the main memory. However, in this case, other memory may be used. According to this embodiment, the term, "access" includes at least one of read and write of data (or program).

A MPU 1 includes an integrated memory management device 2, and accesses a NAND type flash main memory 4.

The NAND type flash main memory 4 stores an address conversion table 5 and rewrite frequency data 6 inside. The rewrite frequency data 6 corresponds to main memory history data showing an accessed state of the main memory.

The address conversion table 5 is data associating a logical address with a physical location (or physical address) in the NAND type flash main memory 4.

The rewrite frequency data 6 shows the number of rewrite times of each page or block of the NAND type flash main memory 4.

The integrated memory management device 2 includes MMU 7, cache controller 8, primary cache memory 3, secondary cache memory 22, main memory MMU 9, and access history storage (NAND information registers) 10. The cache controller 8 includes a first cache controller 8a used for the primary cache memory 3 and a second cache controller 8b used for the secondary cache memory 22. The main memory MMU 9 includes an address relation storage 23. The address relation storage 23 may be separated from the main memory MMU 9.

The first embodiment relates to the case where the cache memory is two. However, in this case, the number of cache memories may be one or three or more.

The MMU 7 converts a logical address of the cache memory 3 into a physical address.

The primary cache memory 3 has a tag storage area 3a and a line storage area 3b.

The secondary cache memory 22 has a tag storage area 22a and a line storage area 22b.

According to this embodiment, each line size of the primary and secondary cache memories 3 and 22 is set as follows. Specifically, the line size is set to the same size (e.g., 256 kilobytes) as the block of the NAND type flash main memory 4 or to a multiple of the page thereof. In this way, the following operations are carried out at a unit of page, a multiple of the page, or block. One is an operation of moving data of the NAND type flash main memory 4 to the primary or secondary cache memory 3 or 22. Another is an operation of moving data of the primary or secondary cache memory 3 or 22 to the NAND type flash main memory 4. Thus, data move can be simplified.

In this embodiment, the primary and secondary cache memories 3 and 22 are a write back type. The secondary cache memory 22 has a storage capacity larger than the primary cache memory 3; however, the operation is low speed.

The first cache controller 8a controls access to the primary cache memory 3.

More specifically, when reading data from the primary cache memory 3, the first cache controller 8a reads data corresponding to a physical address of the primary cache memory 3 according to the physical address obtained from the MMU 7. When writing data to the primary cache memory 3, the first cache controller writes write target data to a location corresponding to the physical address of the primary cache memory 3 according to the physical address obtained from the MMU 7.

The second cache controller 8b controls access to the secondary cache memory 22.

More specifically, when reading data from the secondary cache memory 22, the second cache controller 8b reads data corresponding to a physical address of the secondary cache memory 22 according to the physical address obtained from the MMU 7. When writing data to the secondary cache memory 22, the second cache controller writes write target data to a location corresponding to the physical address of the secondary cache memory 22 according to the physical address obtained from the MMU 7.

The main memory MMU 9 controls access to the NAND type flash main memory 4.

The main memory MMU 9 stores part or all of the address conversion table 5 of the NAND type flash main memory 4 in the address relation storage 23 as address relation data if necessary. The main memory MMU 9 stores part or all of the rewrite frequency data 6 of the NAND type flash main memory 4 to the access history storage 10 as access history data if necessary.

The main memory MMU 9 converts the logical address of the NAND type flash main memory 4 to a physical location.

The main memory MMU 9 reads data from the NAND type flash main memory 4 based on the physical location of the NAND type flash main memory 4. Thereafter, the main memory MMU 9 stores the read data in the primary or secondary cache memory 3 or 22 using the first or second cache controller 8a or 8b.

When reading new data from the NAND type flash main memory 4, the main memory MMU 9 reads address conversion table data and rewrite frequency data related to the new data. Thereafter, the main memory MMU 9 stores the foregoing two data in the address relation storage 23 and the access history storage 10, respectively.

When writing data to the NAND type flash main memory 4, the main memory MMU 9 executes the following controls based on the foregoing address relation data and access history data. One is a control of accessing all area or all blocks of the NAND type flash main memory 4 equally (regardless of the kind). Another is a control for equalizing the rewrite frequency of each area or block of the NAND type flash main memory 4. Another is a control of avoiding a defective area or defective block. The main memory MMU 9 acquires data stored in the primary or secondary cache memory 3 or 22 using the first or second cache controller 8a or 8b. Then, the main memory MMU 9 stores the acquired data in the NAND type flash main memory 4 based on the physical location of the NAND type flash main memory 4.

When data is written in the NAND type flash main memory 4, the main memory MMU 9 updates the address relation data of the address relation storage 23 based on the relationship between a logical address and a physical location related to the written data. The main memory MMU 9 further updates the access history data of the access history storage 10.

The main memory MMU 9 reflects the following data to the address conversion table 5 and the rewrite frequency data 6 of the NAND type flash main memory 4. One is the address relation data stored in the main memory MMU 9 and another is the access history data stored in the access history storage 10. In other words, the main memory MMU 9 matches the address relation data stored in the MPU 1 with the address conversion table 5 stored in the NAND type flash main memory 4. The MMU 9 further matches the access history data of the access history storage 10 with the rewrite frequency data of the NAND type flash main memory 4.

The access history storage 10 stores an access state history of the page or block (physical location) of the NAND type flash main memory 4. According to this embodiment, the access history storage 10 stores rewrite frequency data of part or all pages or blocks in the rewrite frequency data 6 of each block of the NAND type flash main memory 4.

For example, the rewrite frequency of each block is recorded using four bytes. Each block size is set to 256 kilobytes. In this case, if the storage capacity of the NAND type flash main memory 4 is 1 megabyte, the number of blocks stored in the NAND type flash main memory 4 is four. Thus, the storage capacity required for storing the rewrite frequency of each block is 16 bytes. In the same case as above, if the storage capacity of the NAND type flash main memory 4 is 1 gigabyte, the number of blocks stored in the NAND type flash main memory 4 is 4096. Thus, the storage capacity required for storing the rewrite frequency of each block is 16 kilobytes. Likewise, if the storage capacity of the NAND type flash main memory 4 is 16 gigabytes, the storage capacity required for storing the rewrite frequency of each block is 64 kilobytes.

For example, if the NAND type flash main memory 4 has a large capacity such as 128 gigabytes, the access history storage 10 stores part of the rewrite frequency data 6 in the NAND type flash main memory 4. As described above, a symbol "pos" is marked on the rewrite frequency because the access history storage 10 stores part of the rewrite frequency data 6. The "pos" is used the same manner as a cache tag.

Hereinafter, an operation of the main memory MMU 9 will be schematically described.

The main memory MMU 9 stores part of the address conversion table 5 of the NAND type flash main memory 4 in the address relation storage 23. The main memory MMU 9 further stores part of the rewrite frequency data 6 in the access history storage 10.

When the cache memories 3 and 22 does not store read target data, the main memory MMU 9 reads the data from there. Thereafter, the main memory MMU 9 stores data which corresponds to the read data and is included in the address conversion table 5 in the address relation storage 23. In addition, the main memory MMU 9 stores data which corresponds to the read data and is included in the rewrite frequency data 6 in the access history storage 10.

When writing data from the MPU 1 to the NAND type flash main memory 4, the main memory MMU 9 converts a logical address of the NAND type flash main memory 4 into a physical location. Then, the main memory MMU 9 writes write target data in cache lines 3b and 22b to the NAND type flash main memory 4. In addition, the main memory MMU 9 updates address relation data stored in the address relation storage 23 and access history data stored in the access history storage 10.

The main memory MMU 9 updates the address conversion table 5 and the rewrite frequency data 6 based on the address relation data of the address relation storage 23 and the access history data of the access history storage 10.

For example, if the primary cache memory 3 is read only, there is no write to the cache line 3b from the MPU 1. In this case, the main memory MMU 9 overwrites data read from the NAND type flash main memory 4 on the primary cache memory 3 using the first cache controller 8a. When read of the data stored in the primary cache memory 3 is generated, the first cache controller 8a reads data from the first cache memory 3.

Conversely, if the primary cache memory 3 is not read only, the MPU 1 executes a program to write the obtained data to the cache memory 3. When data is written from the MPU 1 to the cache line 3b, the data of the cache line 3b is written back to the NAND type flash main memory 4. In this case, the main memory MMU 9 reads the written-back data from the cache memory 3 via the first cache controller 8a. The main memory MMU 9 selects a page or block having rewrite frequency less than a predetermined number as a write back location of the NAND type flash main memory 4 based on the access history data of the access history storage 10. Thereafter, the main memory MMU 9 stores the written-back data in the selected page or block. Then, the main memory MMU 9 updates address relation data showing a conversion relationship between a logical address and a physical location in the NAND type flash main memory 4 with respect to the selected page or block. The main memory MMU 9 further updates the rewrite frequency of the access history storage 10 with respect to the selected page or block.

Thereafter, the main memory MMU 9 updates the address conversion table 5 and the rewrite frequency data 6 according to the contents of the address relation storage 23 and the access history storage 10.

Figure 2:
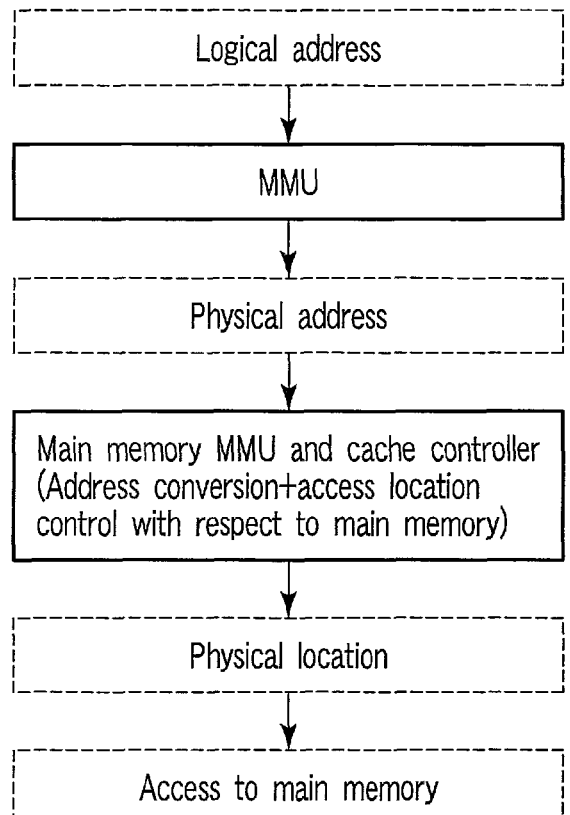
FIG. 2 is a view showing an example of a memory hierarchy of the integrated memory management device in accordance with the first embodiment.

FIG. 2 is a view showing one example of a memory hierarchy of the integrated memory management device 2 of this embodiment.

The memory hierarchy has a hierarchy belonging to the MMU 7, and a hierarchy belonging to the main memory MMU 9 and the cache controller 8.

In the hierarchy of the MMU 7, a logical address is converted into a physical address.

In the hierarchy belonging to the main memory MMU 9, for example, access destination, that is, the physical location of the NAND type flash main memory 4 is determined. In the hierarchy belonging to the main memory MMU 9, access control for a page or block having rewrite frequency less than a predetermined number (e.g., minimum) is carried out.

Then, the integrated memory management device 2 accesses the NAND type flash main memory 4 based on the determined physical location.

Figure 3:
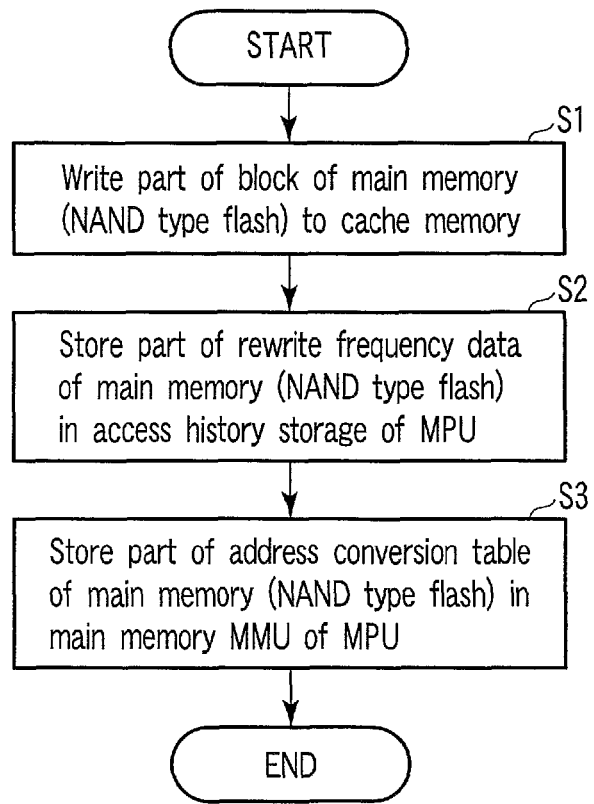
FIG. 3 is a flowchart to explain an example of an operation when a MPU including the integrated memory management device according to the first embodiment stores data of a NAND type flash memory, part of rewrite frequency data of the NAND type flash memory, and part of an address conversion table of the NAND type flash memory in the MPU.

FIG. 3 is a flowchart to explain an example of an operation when the MPU 1 including the integrated memory management device 2 stores data of the NAND type flash main memory 4, part of the rewrite frequency data 6 of the NAND type flash main memory 4, and part of the address conversion table 5 of the NAND type flash main memory 4 in the MPU 1.

In step S1, the main memory MMU 9 reads partial data (first, 1 gigabyte from the header) of the NAND type flash main memory 4 used by the MPU 1. The cache controller 8 writes the read data to cache lines 3b and 22b of the cache memories 3 and 22.

In step S2, the main memory MMU 9 copies part of the rewrite frequency data 6 stored in the NAND type flash main memory 4 into the access history storage 10 included in the MPU 1. (i.e., the part is rewrite frequency of the block with respect to data stored in cache memories 3 and 22. Incidentally, data equivalent to 1 gigabyte from the header may be first copied.)

In step S3, the main memory MMU 9 copies part of the address conversion table 5 stored in the NAND type flash main memory 4 into the address relation storage 23 of the main memory MMU 9 of the MPU 1. (i.e., the part is data showing the relationship between logical address and physical location of the block corresponding to data stored in cache memories 3 and 22. Incidentally, data equivalent to 1 gigabyte from the header may be first copied.)

The procedures of the foregoing steps S1 to S3 are taken in the free sequence, and may be executed in parallel.

Figure 4:
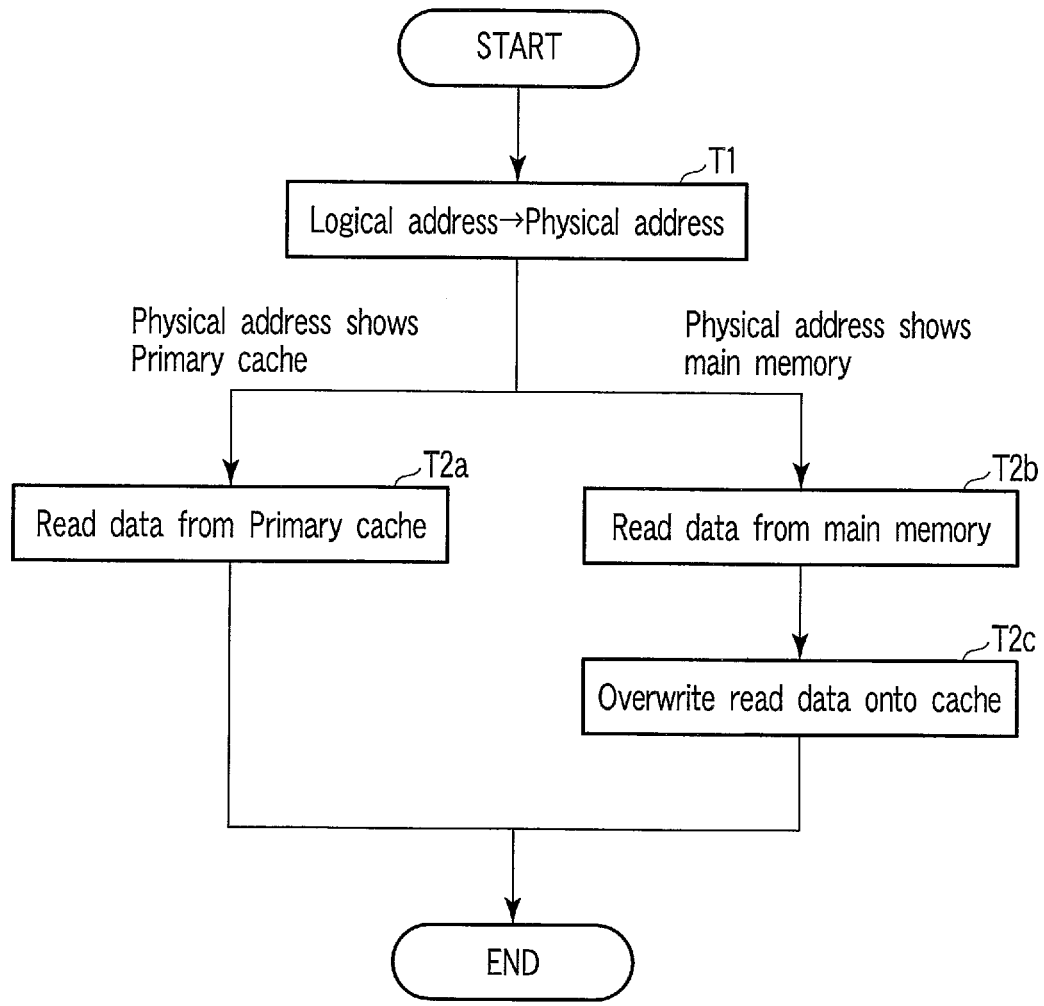
FIG. 4 is a flowchart to explain an example of an operation of reading data from a primary cache memory or the NAND type flash main memory by the MPU including the integrated memory management device according to the first embodiment.

FIG. 4 is a flowchart to explain an example of an operation of reading data from the primary cache memory 3 or NAND type flash main memory 4 by the MPU 1 including the integrated memory management device 2. In this case, the case of reading data from the secondary cache memory 22 is the same as the case of the primary cache memory 3.

In step T1, the MMU 7 and the main memory MMU 9 converts a read target logical address to a physical address.

If the read target physical address indicates the primary cache memory 3, in step T2a, the first cache controller 8a reads the read target data from the primary cache memory 3 based on the physical address.

If the read target physical address (physical location) indicates the NAND type flash main memory 4, in step T2b, the main memory MMU 9 reads data corresponding to the physical address from the NAND type flash main memory 4.

In step T3b, the main memory MMU 9 overwrites the data read from the NAND type flash main memory 4 onto the primary cache memory 3 via the first cache controller 8a.

If Address relation data and access history data corresponding to data newly read from the NAND type flash main memory 4 are not stored in the address relation storage and the access history storage, the main memory MMU 9 stores data corresponding to the newly read data in the address relation storage and the access history storage based on the address conversion table 5 and the rewrite frequency data 6 of the NAND type flash main memory 4.

Figure 5:
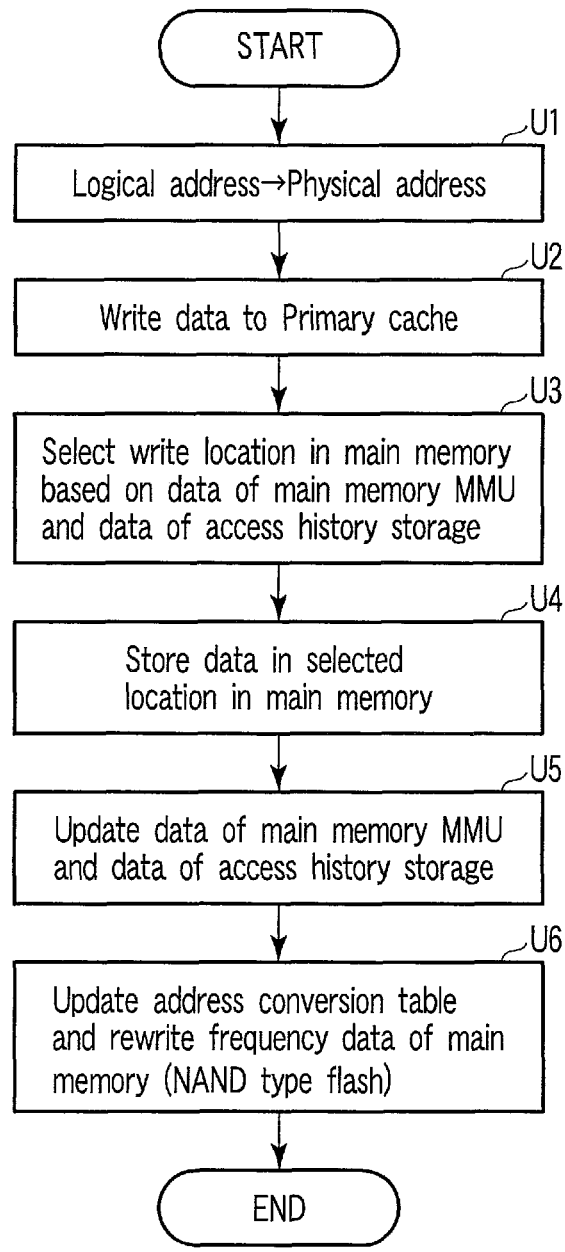
FIG. 5 is a flowchart to explain an example of an operation when overwrite to a cache line of the Primary cache memory occurs from the MPU including the integrated memory management device according to the first embodiment and data in the Primary cache memory is stored in the NAND type flash memory.

FIG. 5 is a flowchart to explain an example of an operation when overwrite to the cache line 3b of the primary cache memory 3 is generated from the MPU 1 including the integrated memory management device 2 of this embodiment and data in the Primary cache memory 3 is stored in the NAND type flash memory 4. In this case, the case where overwrite to the secondary cache memory 22 is generated is the same as the case of the primary cache memory 3.

In step U1, the MMU 7 makes conversion from logical address to physical address.

In step U2, the first cache controller 8a stores write target data in the primary cache memory 3 in accordance with the physical address.

In step U3, the main memory MMU 9 selects a location of a block having rewrite frequency less than a predetermined value or a location of a block having the least rewrite frequency as a rewrite location of the NAND type flash main memory 4 based on the following data. One is address relation data of the address relation storage 23, and another is access history data of the access history storage 10.

In step U4, the main memory MMU 9 stores the write target data in the selected location of the NAND type flash main memory 4.

In step U5, the main memory MMU 9 updates the address relation data of the address relation storage 23 so that the data corresponds to the cache line 3b after overwritten. The main memory MMU 9 further updates the access history data of the access history storage 10.

In step U6, the main memory MMU 9 updates the address conversion table 5 of the NAND type flash main memory 4 to match with the address relation data stored in the main memory MMU 9. In addition, the main memory MMU 9 updates the rewrite frequency data 6 of the NAND type flash main memory 4 to match with the address history data stored in the access history storage 10. For example, update of rewrite frequency data 6 of the NAND type flash main memory 4 is executed when the power of the MPU 1 is turned off or when the access history storage 10 of the MPU 1 is rewritten.

According to this embodiment, the integrated memory management device 2 selects a physical location of the rewritten block based on rewrite frequency. Moreover, the integrated memory management device 2 executes the following controls in place of the foregoing control (operation). One is control of avoiding a defective area or block, and another is control of accessing all areas or blocks of the NAND type flash main memory 4 equally. Another is control of dispersing a location of the access destination area or block. In this case, the access history storage 10 is stored with data such as a generating location of a defective area or block stored in the NAND type flash main memory 4 or rewrite location distribution thereof. The integrated memory management device 2 may freely combine various controls to select a location of the rewritten area or block.

According to this embodiment, the integrated memory management device 2 may execute garbage collection or erase control in the NAND type flash main memory 4 when interchanging data of cache memory 3.

According to this embodiment, data of at least one of the address relation storage 23 and the access history storage 10 of the main memory MMU 9 may be stored in the secondary cache memory 22. In other words, the address relation data stored in the address relation storage 23 may be stored in the secondary cache memory 22. In addition, access history data including rewrite frequency stored in the access history storage 10 may be stored in the secondary cache memory 22.

The integrated memory management device 2 of the MPU 1 according to this embodiment employs the following algorithm. According to the algorithm, the write target, that is, a physical location of the NAND type flash main memory 4 is selected using data stored in the access history storage 10, and then, written back. The integrated memory management device 2 can utilize a program for executing the foregoing algorithm. For example, it is possible to employ excellent algorithm of avoiding rewriting a block having many rewrite frequencies.

The foregoing integrated memory management device 2 according this embodiment employs the following configuration in the MPU 1. Specifically, the foregoing MMU 7, first and second cache controllers 8a, 8b, cache memories 3, 22, main memory MMU 9 and access history storage 10 are integrated. In other words, according to this embodiment, the following architecture is realized. Namely, memory mapping management of the NAND type flash main memory 4 is executed by the integrated memory management device 2 of the MPU 1.

In this way, a hierarchy having large overhead is deleted in the memory hierarchy.

In this embodiment, the MPU 1 executes an operation of a memory controller included in a general NAND type flash memory. As described above, the operation of the MPU and the operation of the memory controller are combined, and then, executed by the MPU 1, and thereby, memory control are cooperated.

According to this embodiment, it is possible to simplify multi-layer memory hierarchy, and to reduce various costs such as time required for access, time required for manufacture, and cost required for manufacture.

According to this embodiment, the memory hierarchy is simple; therefore, a programmer easily grasps a hierarchy where MMU conversion and a generation of replacement of the cache memory are made. Thus, this serves to easily carry out program optimization.

According to this embodiment, it is possible to easily realize optimization between a cache operation of the MPU 1 and an access operation of the main memory.

(Second Embodiment)

The second embodiment relates to a modification example of the foregoing first embodiment.

Figure 6:
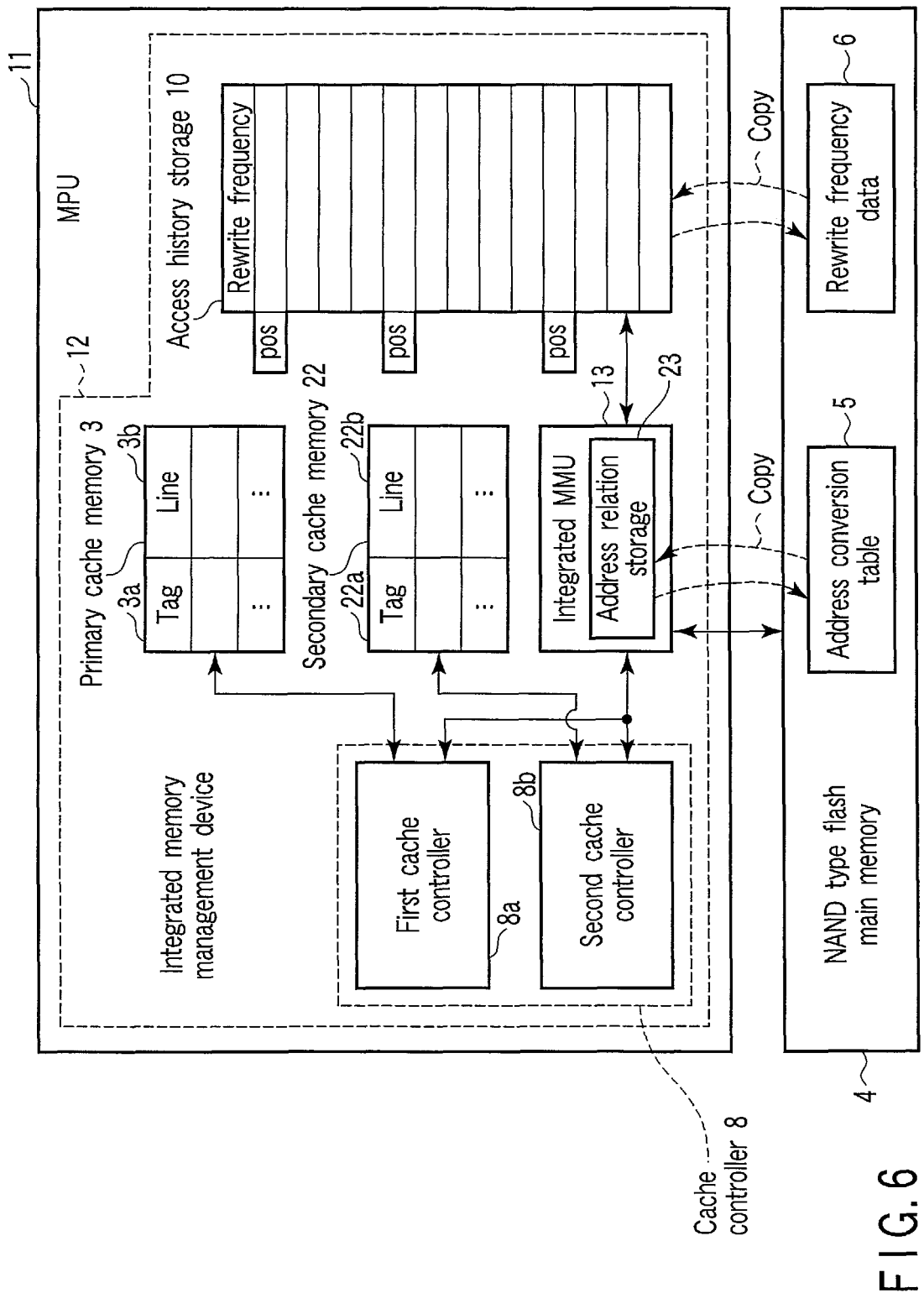
FIG. 6 is a block diagram showing an example of an integrated memory management device in accordance with the second embodiment of the present invention.

FIG. 6 is a bloc diagram showing an example of an integrated memory management device according to the second embodiment.

A MPU 11 includes an integrated memory management device 12 according to the second embodiment. An integrated MMU 13 realizes a function of integrating the MMU 7 and the main memory MMU 9 of the first embodiment.

According to the second embodiment, each tag of the primary and secondary cache memories 3 and 22 is used for managing these cache memories 3 and 22 using a process ID and a logical address.

According to this embodiment, the integrated MMU 13 of a processor, that is, MPU 11 executes a memory mapping management of primary and secondary cache memories 3, 22 and the NAND type flash main memory 4. In this way, various memories are integrally managed.

Figure 7:
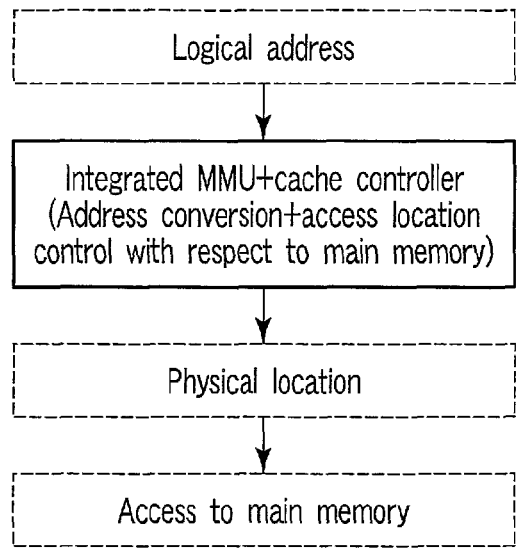
FIG. 7 is a view showing an example of a memory hierarchy of the integrated memory management device in accordance with the second embodiment.

FIG. 7 is a view showing an example of a memory hierarchy of the integrated memory management device 12 according to the second embodiment. The integrated memory management device 12 integrates address conversions for the primary and secondary cache memories 3, 22, and an address conversion for the NAND type flash main memory 4. The address conversions belong to the same memory layer. The integrated memory management device 12 decides an access target area of the primary and secondary cache memories 3, 22 and the NAND type flash main memory 4.

The memory hierarchy belongs to the same hierarchy as the integrated MMU 13 and the cache controller 8.

In the memory hierarchy, when a logical address is converted into a physical location of the NAND type flash main memory 4, control of accessing an area or block having write frequency less than a predetermined number is carried out.

The integrated memory management device 12 accesses the NAND type flash main memory 4 based on the determined physical location.

According to the foregoing embodiment, the MMU 7 and the main memory MMU 9 of the first embodiment are integrated. By doing so, the configuration is simplified, and it is possible to reduce various costs such as time cost required for access and economic cost required for manufacture.

The integrated MMU 13 is used, and thereby, the following address conversions are integrated. One is an address conversion with respect to the primary and secondary cache memories 3 and 22. Another is an address conversion with respect to the NAND type flash main memory 4. For example, storage contents related to a certain process is stored in a near location in the NAND type flash main memory 4 as much as possible. This serves to enable high-speed access. For example, only block having few rewrite frequency is selected, and then, assigned to one process.

(Third Embodiment)

The third embodiment relates to modification examples of the integrated memory management devices 2 and 12 according to the foregoing first and second embodiments.

Figure 8:
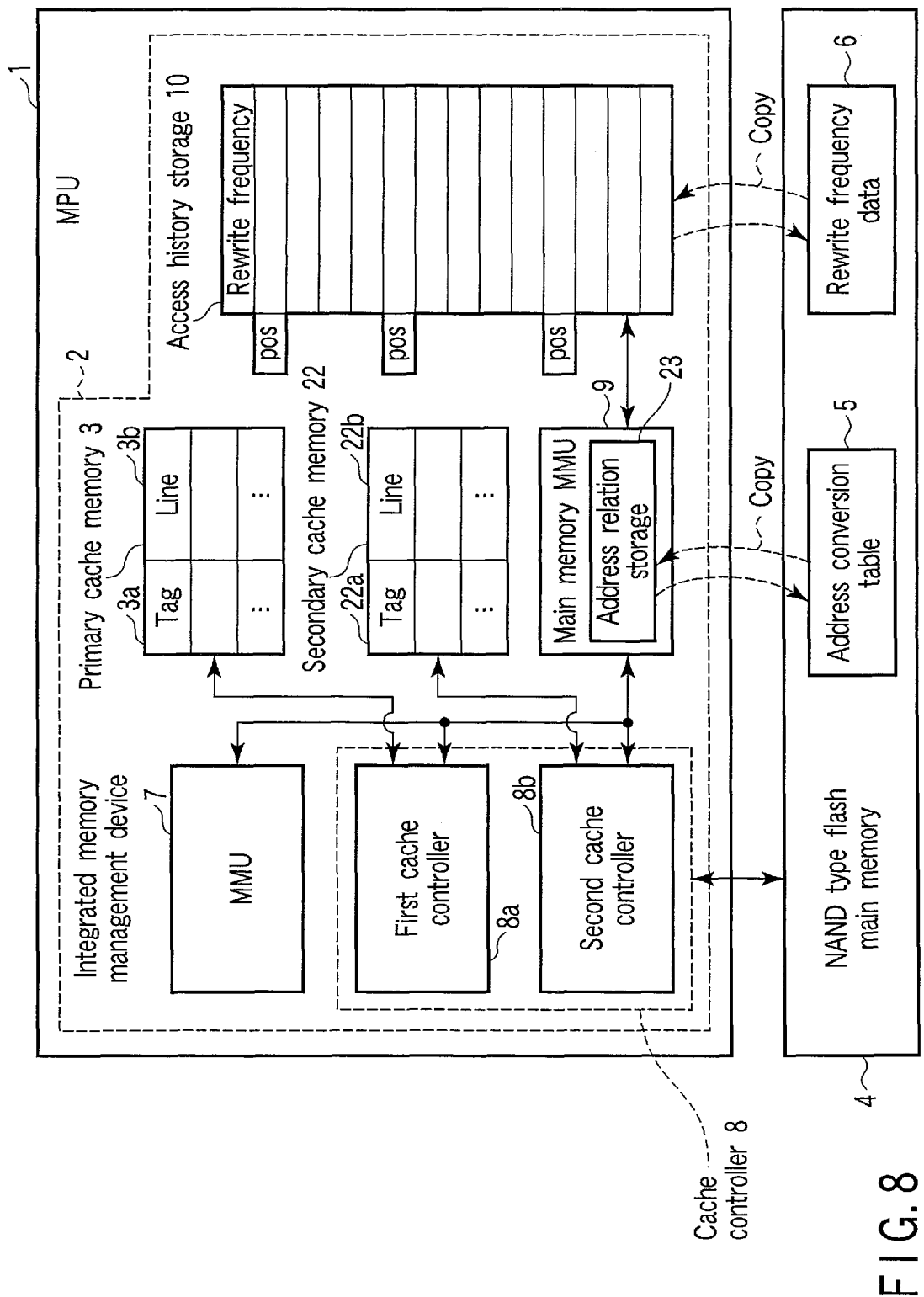
FIG. 8 is a block diagram showing a first example of an integrated memory management device in accordance with the third embodiment of the present invention.

FIG. 8 is a block diagram showing an example of an integrated memory management device 2 according to a modification example of the first embodiment.

In the foregoing first embodiment, the main memory MMU 9 accesses the NAND type flash main memory 4 based on the physical address. However, the cache controller 8 may execute access to the NAND type flash main memory 4 based on the physical address.

In this case, the main memory MMU 9 executes control of converting a logical address to a physical location. Then, the cache controller 8 accesses the NAND type flash main memory 4 based on the physical location selected by the main memory MMU 9. According to this embodiment, the cache controller 8 reads and updates the address conversion table 5 and the rewrite frequency data 6 of the NAND type flash main memory 4 in place of the main memory MMU 9.

FIG. 9 is a block diagram showing an example of an integrated memory management device 12 according to a modification example of the first embodiment.

In the foregoing second embodiment, the integrated MMU 13 executes access to the NAND type flash main memory 4 based on the physical location. However, the cache controller 8 may execute access to the NAND type flash main memory 4 based on the physical address.

In this case, the integrated MMU 13 executes control of converting a logical address to a physical location. Then, the cache controller 8 accesses the NAND type flash main memory 4 based on the physical location selected by the integrated MMU 13. According to this embodiment, the cache controller 8 reads and updates the address conversion table 5 and the rewrite frequency data 6 of the NAND type flash main memory 4.

(Fourth Embodiment)

The fourth embodiment relates to an example to which the integrated memory management devices 2 and 12 according to the foregoing first to third embodiments are applied.

Figure 10:
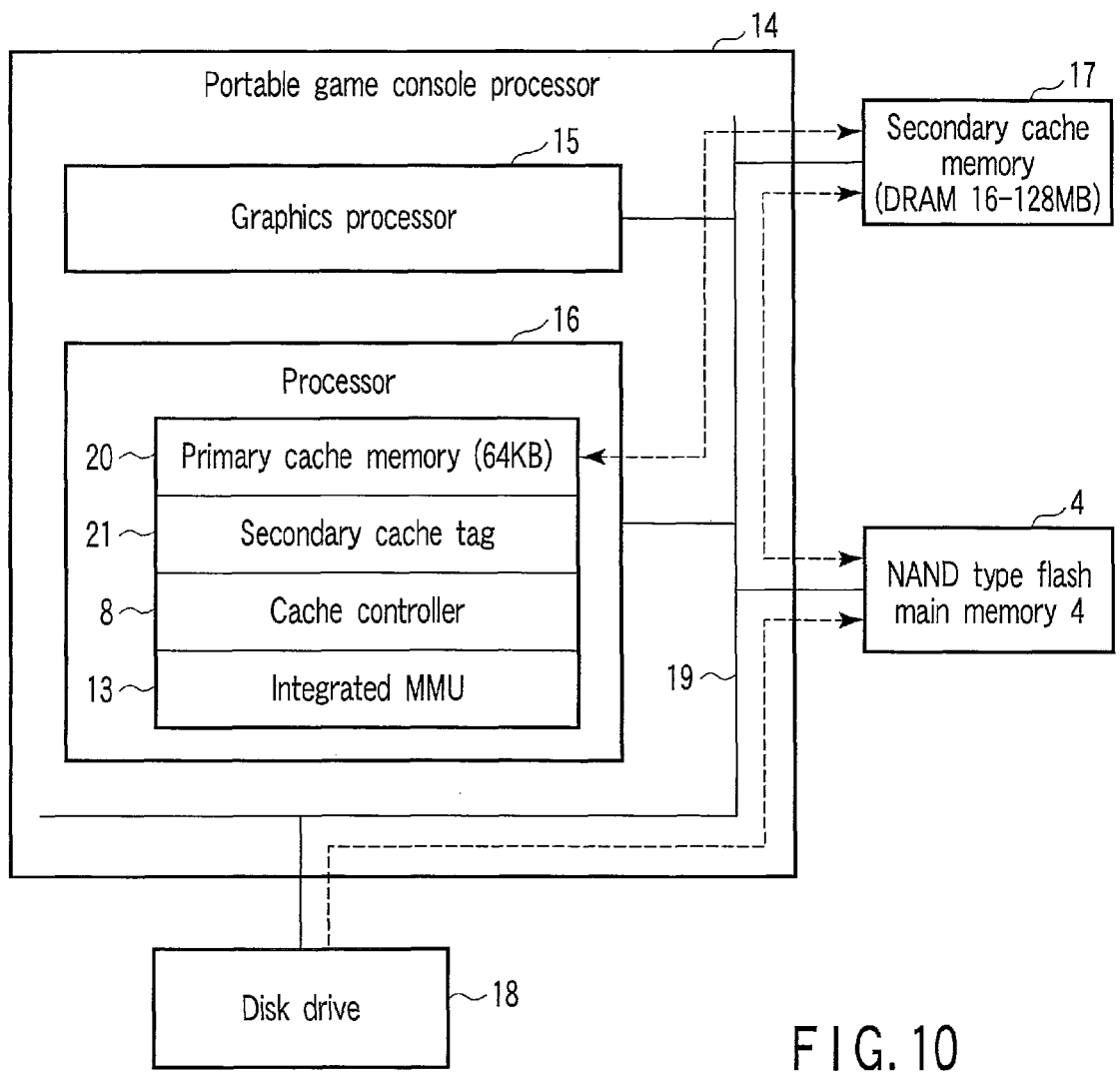
FIG. 10 is a block diagram showing a example to which an integrated memory management device in accordance with a fourth embodiment of the present invention is applied.

FIG. 10 is a block diagram showing an applied example of an integrated memory management device according to the fourth embodiment.

For example, in a game machine or car navigation system, data or program read from a disk drive is once written to a main memory. Thereafter, the data or program written to the main memory is read many times. The fourth embodiment makes an explanation about the case where an integrated memory management device 20 is applied to a game machine. In this case, the integrated memory management device 20 is applied to other devices such as car navigation system in the same manner. In addition, the integrated memory management devices 2, 12 of the foregoing first embodiment may be used in place of the integrated memory management device 20.

A portable game console processor 14 includes a graphics processor 15 and a processor 16.

The graphics processor 15, the processor 16, a secondary cache memory 17, a NAND type flash main memory 4 and a disk drive 18 are connected to a bus 19.

The processor 16 includes a primary cache memory 3, a secondary cache tag 21 for accessing the secondary cache memory 17, a cache controller 8 and an integrated MMU 13.

The processor 16 further includes a rewrite frequency storage 10; however, the rewrite frequency storage 10 is not illustrated in FIG. 10. Incidentally, the processor 16 may use the primary or secondary cache memory 3 or 17 as the rewrite frequency storage 10.

The cache controller 8 controls access to the primary and secondary cache memories 3 and 17. For example, a DRAM is usable as the secondary cache memory 17. According to this embodiment, the secondary cache memory 17 is separated from the portable game console processor 14.

A band width to the secondary cache memory 17 is set to about ten times as much as the NAND type flash main memory 4. For example, an optical disk drive is usable as the disk drive 18.

In this embodiment, write to the NAND type flash main memory 4 is executed when a game cartridge is replaced. In other operations, the NAND type flash main memory 4 is used in read only. Frequently written data or program code and frequently read data or program code are stored in the secondary cache memory 17. In addition, the frequently read data or program code is stored in the primary cache memory 3.

For example, of data or program code stored in the primary or secondary cache memory 3 or 17, data or program code having low frequency is written to the NAND type flash main memory 4. Of data or program code stored in the NAND type flash main memory 4, data or program code having high frequency may be stored in the primary or secondary cache memory 3 or 17.

According to this embodiment, for example, the primary cache memory 3 has a data capacity of about 64 kilobytes, the secondary cache memory 17 has a data capacity of about 16 to 128 megabytes, and the NAND type flash main memory 4 has a data capacity of about 1 gigabytes.

For example, the graphics processor 15 has processing capabilities balanced with a speed of the NAND type flash main memory 4 having 1/10 band width or about two or three times as much as the speed. Low frequency data is read from the NAND type flash main memory 4; conversely, high frequency data is read from the primary or secondary cache memory 3 or 17.

According to this embodiment, garbage collection and erase of the NAND type flash main memory 4 are carried out when cache is replaced (cache miss). In this way, it is possible to provide a processor 16, which can realize optimization described above. Thus, preferable optimization is effected.

An entry size of the secondary cache memory 17 is set to about 1 megabyte, and thereby, the secondary cache memory 17 has good compatibility with the NAND type flash main memory 4.

According to this embodiment, it is possible to prevent overhead from becoming large because virtual memory conversion is made double.

In this embodiment, the processor 16 is provided with the integrated MMU 13, and thereby, the primary cache memory 3, the secondary cache memory 17 and the NAND type flash main memory 4 are integrally managed.

According to this embodiment, it is possible to reduce data stored in resume time.

According to this embodiment, data or program is stored in the NAND type flash main memory 4, and thereby, access to the disk drive 18 is reduced. Thus, this serves to reduce wait time, and to improve user's operability and satisfaction.

According to this embodiment, the NAND type flash main memory 4 having a memory unit price cheaper than the secondary cache memory 17 (DRAM) is used, and thereby, a large number of data or program is accessible at high speed.

(Fifth Embodiment)

The fifth embodiment relates to an integrated memory management device which is interposed between a plurality of processors and a main memory.

FIG. 11 is a block diagram showing the configuration of an integrated memory management device according to a fifth embodiment.

The memory device of this embodiment includes an integrated memory management device 24. The integrated memory management device 24 is connected with a plurality of processors (for example, Codec IP or Graphic IP) 251 to 254 via a system bus 30. The integrated memory management device 24 is applied to the multiprocessor configuration. The integrated memory management device 24 is further connected with a non-volatile main memory 26 such as a NAND type flash memory, for example. According to the fifth embodiment, the number of processors is one or more, and may be freely changeable.

In the main memory 26, writing and reading are carried out at a unit of plural bits called as a page. Erasing is collectively carried out at a unit collecting a plurality of pages called as a block.

Some of the foregoing processors 251 to 254 execute a process including a logical address. According to this embodiment, processors 251, 252 and 254 execute processes 271, 272 and 274, respectively. Incidentally, the foregoing processes 271, 272 and 274 may be an operating system.

The processors 251 to 254 include primary cache memories 281 to 284 and secondary cache memories 291 to 294, respectively.

The integrated memory management device 24 executes wear leveling, and makes a conversion from a logical address to a physical address.

The integrated memory management device 24 executes wear leveling at a page unit, a multiple unit of the page or block unit of the main memory 26. A wear leveling counter is stored in a redundancy area 26a of the main memory. The redundancy area 26a is a redundancy area given every page or block of the main memory 26. When making mapping in a memory space, the integrated memory management device 24 secures memory considering wear leveling.

The integrated memory management device 24 handles a removable memory as a main memory, and maps it in a memory space.

The integrated memory management device 24 is provided on the side of the main memory 26 rather than the side of the processors 271 to 274. However, the integrated memory management device 24 may be provided on the side of the processors 271 to 274.

The integrated memory management device 24 changes a page size based on an instruction and data. For example, an instruction page size is set to a small size such as 16 kilobytes, and a data page size is set to a large size such as 512 kilobytes.

The main memory 26 has the same memory page size as the page size (process or OS) of the integrated memory management device 24 or a memory page size of multiple of the page size of the MMU.

Page transmission is collectively executed between primary and secondary cache memories 281 to 284 and 291 to 294 and the main memory 26. The batch transmission is carried out at the page unit, the multiple unit of the page or the block unit of the main memory (e.g., 256 kilobytes to 512 kilobytes).

Access to primary and secondary cache memories 281 to 284 and 291 to 294 is made based on a logical address. The logical address is used on the system bus 30.

The integrated memory management device 24 integrally executes the following conversions. One is a conversion from a process level logical address to a physical address with respect to the processors 271 to 274. Another is a conversion from a logical page or logical block to a physical block for the wear leveling of the page unit, the multiple unit of the page or block unit of the main memory 26.

According to the fifth embodiment, a system logical address 31 having a format shown in FIG. 12 is used. The system logical address 31 is composed of a processor ID and a process ID and a process internal logical address. At least one of processor ID and a process ID is may be converted. For example, the length of at least one of the processor ID and process ID is may be shortened by hashing. And the system logical address 31 may include a converted content. For example, the processor ID and process ID may be converted by hashing, and the system logical address 31 may include converted bits by hashing and the process internal logical address.

The main memory 26 is stored with a page table 26b in the entire system. Specifically, the main memory 26 has a page table 26b integrating processes 271, 272 and 274, and does not have a page table every process 271, 272 and 274.

According to this embodiment, a main memory having the same capacity as HDD is used as the main memory 26. In this case, there is no need of using a secondary storage (swap out) because of using a memory space larger than a physical memory. In the conventional case, for example, the physical memory is a DRAM, and has a capacity of about 1 GB. However, if a 4-GB logical memory space is used every process, a secondary storage area is secured on the HDD having a larger storage capacity, and then, swap in/swap out must be executed. On the contrary, according to this embodiment, the main memory has the same level storage as the HDD capacity; therefore, the secondary storage does not need to be used.

Thus, this serves to simplify the device configuration and operation.

According to this embodiment, instant on/off is carried out; therefore, resume is effected at a high speed.

In the conventional case, a file must be loaded before execution. On the contrary, according to this embodiment, there is only need to jump into an execution address on the cache memories 281 to 284 or 291 to 294 or the main memory 26. Thus, there is no need of lading the file before execution.

(Sixth Embodiment)

The sixth embodiment relates to a modification example of the foregoing fifth embodiment.

FIG. 13 is a block diagram showing the configuration of an integrated memory management device according to a sixth embodiment.

In the memory device of this embodiment, a plurality of integrated memory management devices 241 and 242 is connected with a plurality of processors (including Codec IP, graphic IP) 251 to 254 via a network. The integrated memory management devices 241 and 242 are connected with a plurality of non-volatile main memories 261 and 262 such as NAND type flash memory, for example.

The number of the MMUs and the number of the main memories may be freely changeable.

The main memory 261 has the same features as the main memory 26 of the foregoing fifth embodiment. The main memory 261 has a redundancy area 261a, which stores a wear leveling counter, and a page table 261b, which integrates these processes 271, 272 and 274. The main memory 262 has the same features as the main memory 261.

According to the sixth embodiment, a logical address 34 is used. The logical address shown in FIG. 14 is composed of IP address or IPv6 address of the network 33, processor ID and process ID, and process internal logical address. At least one of address and ID is may be converted. For example, the length of at least one of the address and ID is may be shortened by hashing. And the logical address 34 may include a converted content. For example, IP address or IPv6 address, the processor ID and process ID may be converted by hashing, and the logical address 34 may include converted bits by hashing and the process internal logical address.

The main memories 261 and 262 have the same memory page size as that of the integrated memory management devices 241 and 242 or has a memory page size of integer multiples of the page size of the integrated memory management devices 241 and 242.

Page transmission is collectively executed between primary cache memories 281 to 284 and secondary cache memories 291 to 294 and main memories 261 and 262. The batch transmission is executed at a page unit, integer multiples unit of the page size, or block unit (e.g., 256 kilobytes to 512 kilobytes) of the main memory.

According to this embodiment, access to the primary cache memories 281 to 284 and to secondary cache memories 291 to 294 is made based on a logical address. A logical address is used on the network 33.

The integrated memory management devices 241 and 242 integrally make the following conversions. One is a conversion from a process level logical address to a physical address with respect to the processors 271 to 274. Another is a conversion from a logical page or block to a physical page or block for wear leveling of the page unit, integer multiples unit of the page size, or block unit of the non-volatile main memories 261 and 262.

According to the fifth embodiment, the same effect as the foregoing fifth embodiment is obtained in a wide memory space via the network 33.

(Seventh Embodiment)

The seventh embodiment relates to a modification example of the foregoing fifth and sixth embodiments. In the following description, a modification example of the fifth embodiment will be hereinafter described. The sixth embodiment may be also modified in the same manner.

FIG. 15 is a block diagram showing the configuration of an integrated memory management device according to a seventh embodiment.

A plurality of processors 351 to 354 is connected with a main memory 26 via a system bus 30. According to this embodiment, the number of processors may be freely changeable.

Some of the foregoing processors 351 to 354 execute a process including a logical address. According to this embodiment, processors 351, 352 and 354 execute processes 271, 272 and 274, respectively. Incidentally, the foregoing processes 271, 272 and 274 may be an operating system.

The foregoing processors 351 to 354 include primary cache memories 361 to 364, secondary cache memories 371 to 374 and MMUs 381 to 384, respectively.

The MMUs 381 to 384 each execute wear leveling, and make a conversion from a logical address to a physical address. These MMUs 381 to 384 are provided on the side of the processors 351 to 354.

The main memory 26 has the same memory page size as that of the MMUs 381 to 384 or has a memory page size of integer multiples of the page size of the MMUs 381 to 384.

Page transmission is collectively executed between primary cache memories 361 to 364 and secondary cache memories 371 to 374 and the main memory 26. The batch transmission is executed at a block (page) unit (e.g., 256 kilobytes to 512 kilobytes) of the main memory.

According to the seventh embodiment, a physical address is used for making access to primary cache memories 361 to 364 and for making access to secondary cache memories 371 to 374. A physical address is also used on the system bus 30.

The MMUs 381 to 384 provided for the processors 351 to 354 each make the following conversions. One is a conversion from a process level logical address to a physical address. Another is a conversion from a logical address to a physical address for wear leveling of a page unit, integer multiples unit of the page size, or block unit of the main memory 26.

As described above, according to the seventh embodiment, even if the MMUs 381 to 384 are provided on the side of the processors 351 to 354, the same effect as the foregoing fifth embodiment is obtained.

(Eighth Embodiment)

In this embodiment, details of the fifth embodiment will be described.

FIG. 16 is a block diagram illustrating an example of the structure of an integrated memory management device 24 according to this embodiment.

A NAND type flash main memory 26 includes a physical block 39 corresponding to a physical address, a page table 26b, memory usage information 40, and memory peculiarity (unique) information 41.

The cache line size of each of the primary cache memories 281 to 284 and the secondary cache memories 291 to 294 of the processors 251 to 254 is equal to the integral multiples of the page size or the block size of the NAND type flash main memory 26, which makes it possible to improve the transmission efficiency of data.

In the NAND type flash main memory 26, various types of data, such as data D1, may exist in a plurality of physical blocks 39. For example, a plurality of data, such as data D1 and D2, may exist in one physical block 39.

The data D1 and D2 may include unique read/write (read and write) frequency information items E1 and E2, respectively. For example, each of the data D1 and D2 includes at least one of static information and dynamic information. The static information means a predetermined value. The dynamic information includes the number of times data is actually rewritten and the number of times data is actually read.

For example, information indicating that data for a captured image is read or written one time for two hours immediately after image capture, and information indicating that data for a captured image is read one time within two weeks and is not written after three days have elapsed from image capture is stored as the static information of image data of a digital camera. In addition, for example, the following information is stored as the static information of the cache information of a web browser: information indicating that data is written and read one time for several minutes; information indicating that the information of a site, which is accessed a predetermined number of times or more, is written one time per day; information indicating that, when there is a periodic access pattern, the information thereof is written according to the periodic access pattern; and information indicating that the number of write operations is large for a predetermined amount of time.

The static information needs to include a value that is effective for various types of data. A static information setting file may be shared on a network.

One page table 26b may suffice for one system. Alternatively, the page table 26b may not be provided.

The memory usage information 40 includes the number of read and write operations in each memory area and the number of times each data is read and written. Specifically, for example, the memory usage information 40 includes the number of times data is rewritten in each memory area (page or block), the number of times data is read from each memory area, and data information (for example, the number and type of data information items, the number of times data is read, and the number of times data is rewritten) stored in the memory area.

The memory peculiarity information 41 includes, for example, the page size and the block size of the NAND type flash main memory 26, the number of times data can be rewritten in the memory, and the number of time data can be read from the memory. Specifically, for example, the memory peculiarity information 41 includes the page size and the block size of the NAND type flash main memory 26, the total storage capacity of the memory, SLC (single level cell) area information (for example, a block position, a size, the number of times data can be read, and the number of times data can be written), and MLC (multi level cell) area information (for example, a block position, a size, the number of times data can be read, and the number of times data can be written).

The integrated memory management device 24 converts a logical address for each process (or an OS) into a physical address, and converts a logical address for the NAND type flash main memory 26 into a physical address.

The integrated memory management device 24 performs optimal wear-leveling on the basis of the read/write frequency information items E1 and E2 peculiar to the data D1 and D2, the memory usage information 40, and the memory peculiarity information 41.

The integrated memory management device 24 includes a microprocessor 42, a work memory 43, an information register 44, and a cache memory 45.

The microprocessor 42 uses the information register 44 and the work memory 43 to perform memory management. The cache memory 45 temporarily stores data from the processors 271 to 274 and data from the NAND type flash main memory 26. In addition, the cache memory 45 may be an external DRAM.

FIG. 17 is a block diagram illustrating an example of the function of the microprocessor 42.

The microprocessor 42 has an acquisition function 42a, an address conversion function 42b, an access function 42c, and a transmission function 42d.

When any one of the plurality of processors 251 to 254 reads data from the NAND type flash main memory 26, the acquisition function 42a acquires a read logical address from any one of the plurality of processors 251 to 254.

The address conversion function 42b converts the read destination logical address acquired by the acquisition function 42a into the read destination physical address of the NAND type flash main memory 26. For example, the NAND type flash main memory 26 is divided into areas having each group attribute. The NAND type flash main memory 26 comprises memory peculiarity information 41 including the group attributes of the areas. In this case, The address conversion function 42b refers to read/write frequency information items E1 and E2 peculiar to data D1 and D2 and the memory peculiarity information 41. The read/write frequency information items E1 and E2 are defined by an operating of a file management program (process) on a processor. The address conversion function 42b decides the write destination physical address representing an area corresponding to the group attribute of the read/write frequency information items E1 and E2 peculiar to data D1 and D2.

The access function 42c reads data corresponding to the read destination physical address from the NAND type flash main memory 26. The size of the read data is equal to a page size, the integer multiples of the page size of the NAND type flash main memory 26, or the block size thereof.

The transmission function 42d transmits the read data to the cache memory of the processor that has issued the read logical address. The cache size of the cache memory of the processor that has issued the read logical address depends on (e.g., equal to) a page size, the integer multiples of the page size of the NAND type flash main memory 26, or the block size thereof.

When any one of the plurality of processors 251 to 254 writes data in the NAND type flash main memory 26, the acquisition function 42a acquires a write destination logical address and write data from the processor. The size of the write data is equal to the cache size.

The address conversion function 42b converts the write destination logical address acquired by the acquisition function 42a into the write destination physical address of the NAND type flash main memory 26.

The access function 42c writes the write data in the NAND type flash main memory 26 at a position corresponding to the write destination physical address.

The address conversion function 42b of the microprocessor 42 performs wear-leveling on the basis of at least one of the read/write frequency information items peculiar to data, the memory usage information 40, and the memory peculiarity information 41.

Figure 18:
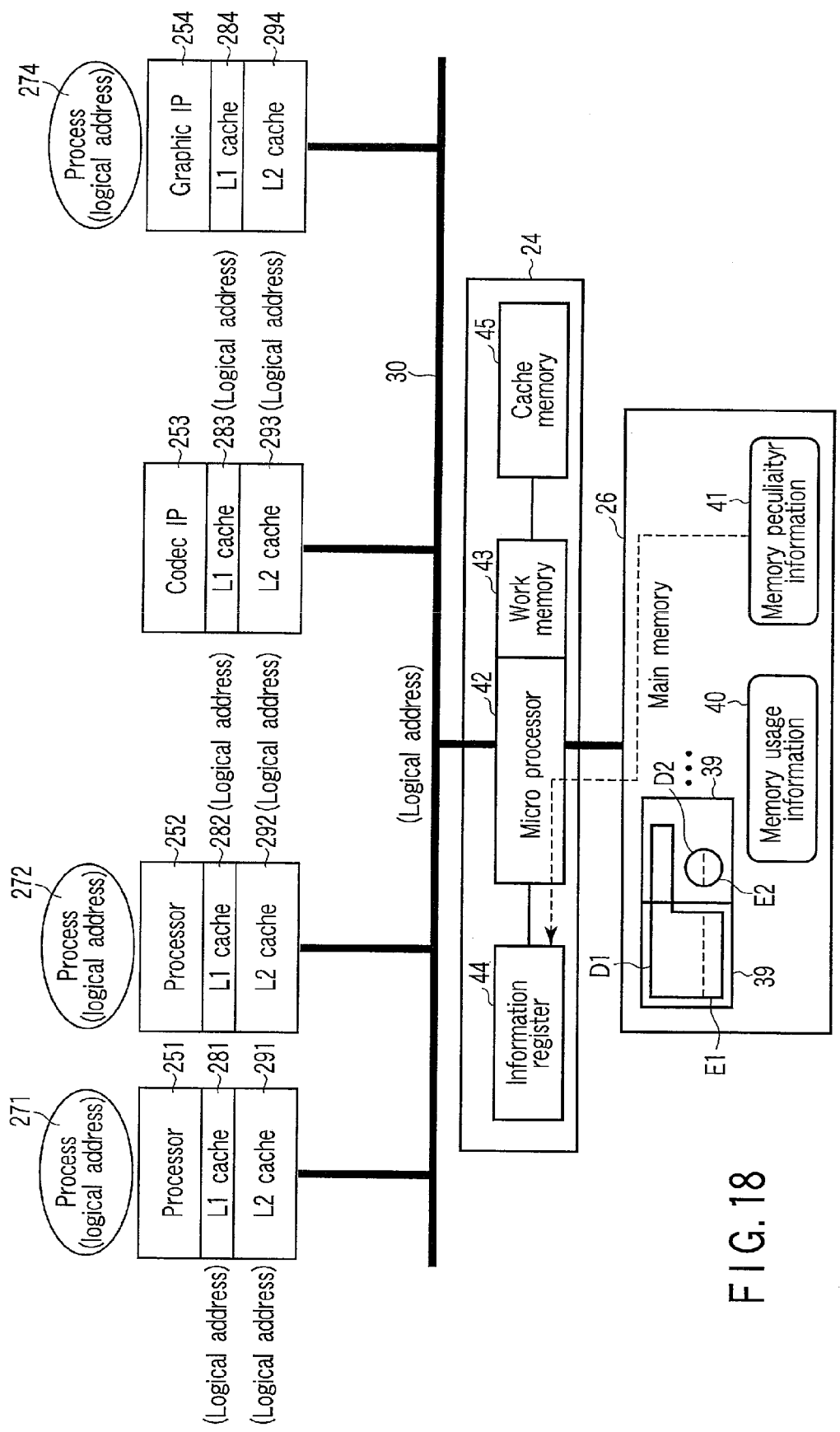
FIG. 18 is a diagram illustrating an example of the first operation of a transmission algorithm of the integrated memory management device according to the eighth embodiment.

FIG. 18 is a diagram illustrating an example of the first operation of a transmission algorithm of the integrated memory management device 24.

The microprocessor 42 of the integrated memory management device 24 reads out the memory usage information 40 and the memory peculiarity information 41 and stores the information in the information register 44 during start-up. The memory peculiarity information 41 includes the page size and the block size of the NAND type flash main memory 26. The cache size of each of the processors 271 to 274 is equal to a page size, the integer multiples of the page size of the NAND type flash main memory 26 or the block size thereof.

When the integrated memory management device 24 is applied to the existing processor and it is impossible to change the cache size of the processor, the microprocessor 42 performs buffering in the cache memory 45 to adjust a difference between the cache size of each of the processor 271 to 274 and the integer multiple of the page size or the block size of the NAND type flash main memory 26. For example, the microprocessor 42 reads data corresponding to a 256-kilo-byte page size to the cache memory 45, and outputs data corresponding to a cache line of 4 kilobytes to any one of the processors 271 to 274.

FIG. 19 is a diagram illustrating an example of the second operation of the transmission algorithm of the integrated memory management device 24.

The microprocessor 42 of the integrated memory management device 24 receives an access request corresponding to one cache line from the processor 252 (Tr19A).

Then, the microprocessor 42 reads data that is equal to a block or the integer multiple of a page corresponding to the access request from the NAND type flash main memory 26, and stores the read data in the cache memory 45 (Tr19B).

Then, the microprocessor 42 transmits data corresponding to the access request from the cache memory 45 to the processor 252 (Tr19C).

FIG. 20 is a diagram illustrating an example of the third operation of the transmission algorithm of the integrated memory management device 24.

The processor 252 rewrites data in the cache memory 282 or the cache memory 292 (Tr20A).

Then, the microprocessor 42 of the integrated memory management device 24 caches out the data written in the cache memory 282 or the cache memory 292, and transmits the data to the cache memory 45 (Tr20B).

In this way, the microprocessor 42 performs wear-leveling on the basis of the read/write frequency information items included in the data, and the memory usage information 40 and the memory peculiarity information 41 stored in the information register 44 to determine a physical block 39 for data writing among a plurality of physical blocks of the NAND type flash main memory 26.

The microprocessor 42 stores the rewritten data stored in the cache memory 45 in the determined physical block 39 (Tr20C).

In the write operation, if necessary, the movement of a memory block and garbage collection are performed.

FIG. 21 is a block diagram illustrating an example of the wear-leveling.

The NAND type flash main memory 26 includes two or more banks 46a and 46b.

The microprocessor 42 additionally stores data (a block or a page) in one bank 46a.

When data is erased, the microprocessor 42 erases target data from the bank 46a. However, until data is stored in the last area of the bank 46a, the additional data storage process is sequentially performed. In the bank 46a, which is a write target, data writing is not performed on an area from which data is erased. Therefore, when data is erased from the bank 46a, which is a write target, the area from which the data is erased is empty.

When data is completely stored in the last area of the bank 46a, the microprocessor 42 copies valid data that has not been erased from the bank 46a to the bank 46b while performing garbage collection, and additionally stores new data in the bank 46b, starting from the area following the area in which the copied data is stored. The microprocessor 42 copies data of a bank to another bank, and then clears the bank. Then, the same process as described above is repeated.

Next, the detailed example of the wear-leveling algorithm used by the microprocessor 42 of the integrated memory management device 24 will be described.

First, the microprocessor 42 receives data to be written from a processor or an OS. When there is a plurality of data to be written, data having the highest write frequency is used as a standard. When the existing processor or OS is used, the microprocessor 42 examines the head of data to determine the type of data.

For example, when the type of data to be written is compressed image data, the write frequency of the data to be written is low. Therefore, the microprocessor 42 determines an MLC area as a rewrite area. Alternatively, when the type of data to be written is compressed image data, the microprocessor 42 determines an empty area in which the rewrite frequency is high as a rewrite area.

For example, when the type of data to be written is cache data of a web browser, the write frequency of data is high. Therefore, the microprocessor 42 determines an SLC area as the rewrite area.

For example, the microprocessor 42 determines an empty block having the lowest rewrite frequency in the SLC area or the MLC area as a write area.

For example, when the number of rewrite operations in all the empty areas (for example, empty blocks) of the NAND type flash main memory 26 reaches a predetermined percent (for example, 80%) of the maximum number of times data can be written, the microprocessor 42 selects an area having a low rewrite frequency on the basis of static information and an area having a low rewrite frequency on the basis of dynamic information, from the areas in which data has already been written. Then, the microprocessor stores, in an empty area, the data in the selected area. Then, the microprocessor 42 erases the data stored in the selected area. That is, the microprocessor shifts data from the selected area to an empty area.

In this embodiment, the microprocessor 42 of the integrated memory management device 24 may manage a plurality of NAND type flash main memories 26.

Figure 22:
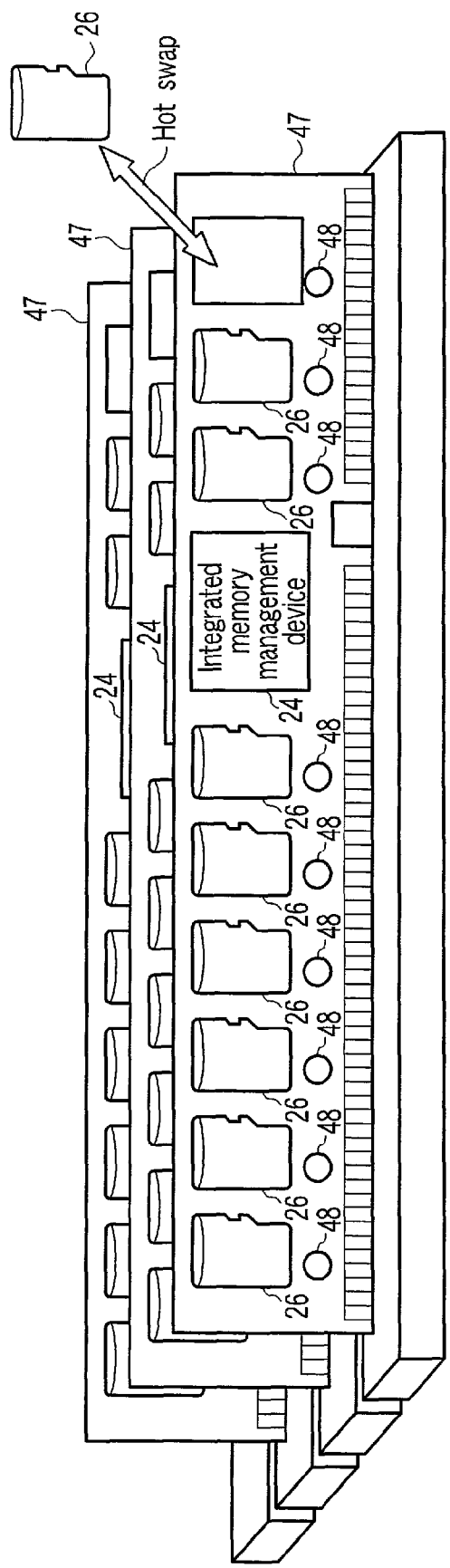
FIG. 22 is a perspective view illustrating an example of an integrated memory management device that manages a plurality of NAND type flash main memories.

FIG. 22 is a perspective view illustrating an example of the integrated memory management device 24 that manages a plurality of NAND type flash main memories 26.

One integrated memory management device 24 and a plurality of NAND type flash main memories 26 form one memory unit 47. In FIG. 22, three memory units 47 are formed.

The integrated memory management device 24 manages an access to a plurality of NAND type flash main memories 26 belonging to one memory unit 47.

A plurality of integrated memory management devices 24 provided in the plurality of memory units 47 are operated such as one memory management device in cooperation with each other.

The integrated memory management device 24 of the memory unit 47 includes an ECC function and an RAID function for a plurality of NAND type flash main memories 26 in the memory unit 47, and performs mirroring and striping.

Each of the NAND type flash main memories 26 is hot-swappable (replaceable) even when the memory unit 47 is turned on (operated). Each of the plurality of NAND type flash main memories 26 is provided with a button 48.

The button 48 includes an alarm output unit (for example, an LED). For example, the alarm output unit has a first color (green) indicating a normal condition and a second color (red) indicating that replacement is needed.

When the button 48 is pushed, a notification signal is transmitted to a process and an OS. In a stable state in which access is not performed, the button 48 has a third color (blue), and the NAND type flash main memory 26 corresponding to the button 48 is hot-swappable.

When a hot-swap is executed, a lump which represents hot-swappable is lighted after the button 48 for a hot-swappable request was pushed and write back had been finished.

The microprocessor 42 of the integrated memory management device 24 determines whether the number of rewrite operations or read operations of each of the NAND type flash main memories 26 reaches the upper limit described in the memory peculiarity information 41 on the basis of the memory usage information 40 and the memory peculiarity information 41 stored in the information register 44. Then, when it is determined that the number of rewrite operations or read operations reaches the upper limit, the microprocessor 42 notifies or alerts that the memory should be replaced.

In this embodiment, when the page size or block size of the NAND type flash main memory 26 is large, preload is available.

In the case of the preload, the microprocessor 42 of the integrated memory management device 24 preloads data, which is more likely to be frequently accessed, to the cache memory 45 in advance, with reference to the data peculiarity (unique) information items E1 and E2 of the NAND type flash main memory 26.

Alternatively, the microprocessor 42 preloads data that has periodicity and is more likely to be accessed within a predetermined period of time before the predetermined period of time elapses.

Figure 23:
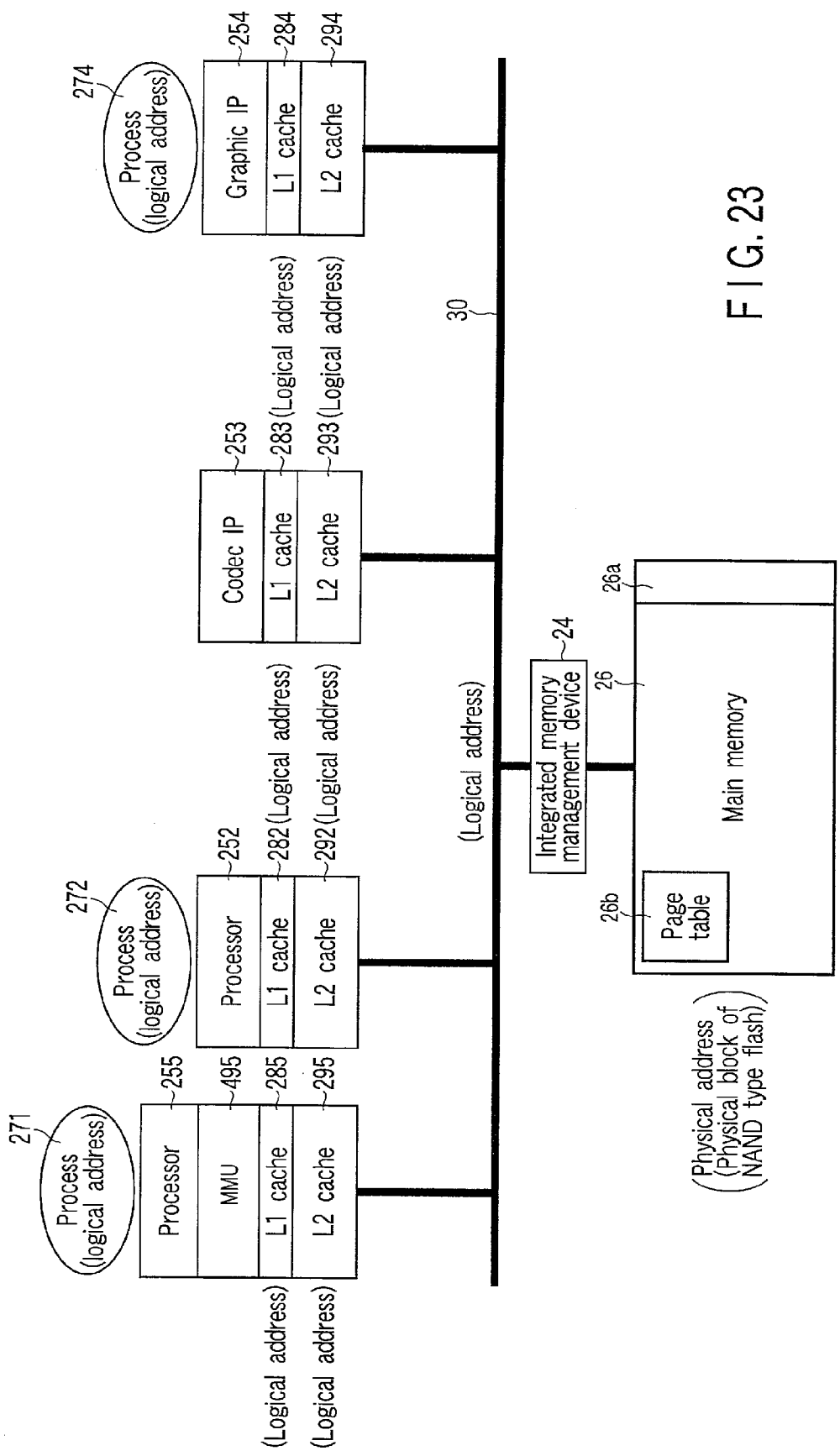
FIG. 23 is a block diagram illustrating an example of a multi-processor system using the integrated memory management device according to the eighth embodiment for an existing processor including an MMU.

FIG. 23 is a block diagram illustrating an example of a multi-processor system using the integrated memory management device 24 according to this embodiment, which is compared to the existing processor including an MMU.

A processor 255 is the existing processor, and includes an MMU 495, a primary cache memory 285, and a secondary cache memory 295. The processor 255 executes a process 275. The system shown in FIG. 23 includes both address conversion (translation) by the MMU 495 according to the related art and address conversion by the memory management device according to this embodiment. In this case, when the MMU 495 of the processor 255 accesses the NAND type flash main memory 26, first, it accesses the page table 26b of the NAND type flash main memory 26. However, the page table 26b includes a content which does not perform address conversion, but passes through the conversion. For example, both an address before conversion and a converted address which are same values in the page table 26b. Therefore, the MMU 495 of the processor 255 does not perform address conversion, but the integrated memory management device 24 can perform address conversion.

Next, a difference between the system using the integrated memory management device 24 according to this embodiment shown in FIG. 16 and the multi-processor system according to the related art will be described.

FIG. 24 is a block diagram illustrating an example of a general multi-processor system according to the related art.

In the multi-processor system according to the related art, the existing processors 255 to 258, a main memory 50, and a secondary storage device 51 are connected to a system bus 30.

The processors 255 to 258 include MMUs 495 to 498 and the primary cache memories 285 to 288, and the secondary cache memories 295 to 298, respectively. The processors 255 to 258 perform the processes 275 to 277, respectively.

Each of the MMUs 495 to 498 performs translation between a logical address and a physical address. An access from each of the processors 255 to 258 to any one of the primary cache memories 285 to 288, the secondary cache memories 295 to 298, the main memory 50, and the secondary storage device 51 is performed on the basis of the physical address.

For example, a volatile storage device, such as a DRAM, is used as the main memory 50. The main memory 50 includes page tables 525 to 528 for the processes 275 to 277.

For example, a hard disk drive, an SSD (solid state drive), or a NAND type flash memory is used as the secondary storage device 51.

In the multi-processor system according to the related art, for example, a DRAM is used as the main memory. However, in the multi-processor system according to this embodiment, the NAND type flash main memory 26 is used as the main memory. In general, the bit cost of the DRAM is higher than that of the NAND type flash main memory 26. Therefore, this embodiment can reduce costs.

In the multi-processor system according to the related art, the main memory is volatile. However, in the multi-processor system according to this embodiment, a non-volatile NAND type flash main memory 26 is used as the main memory. Therefore, this embodiment can perform instant boot-up, and reduce the time required to load, for example, a program or data to the main memory. As a result, it is possible to increase an operating speed.

The multi-processor system according to the related art is provided with both the volatile main memory 50 and the non-volatile secondary storage device 51. In contrast, the multi-processor system according to this embodiment is provided with the NAND type flash main memory 26. Therefore, it is possible to use a non-volatile main memory and remove the secondary storage device, such as a hard disk. In this embodiment, it is not necessary to provide a DRAM as the main memory. Therefore, in this embodiment, when a DRAM is provided as a cache, the storage capacity of the cache may be reduced. As a result, according to this embodiment, it is possible to simplify the structure of a system and the management of a memory, which results in a reduction in costs.

In the multi-processor system according to the related art, the page tables 525 to 528 should be shared, which causes access congestion. In contrast, in the multi-processor system according to this embodiment, it is not necessary to share the page tables. Therefore, it is possible to remove access congestion.

When a DRAM or SSD is used as the secondary storage device as in the related art, the concept of, for example, a file or SATA (serial ATA) is used. In this case, an overhead certainly occurs. In contrast, in this embodiment, data is not abstracted by a file, but is directly accessed by the memory. Therefore, according to this embodiment, it is possible to improve the access efficiency of data.

In the related art, a DRAM or SSD is used for the secondary storage device. However, in this embodiment, at the time of start-up, a disk search time is not required, and it is possible to reduce the start-up time. In this embodiment, it is also possible to increase the start-up speed of an application. In this embodiment, it is also possible to increase a search speed and the execution speed of an application. In this embodiment, it is possible to operate applications for a plurality of processors. In this embodiment, since a non-volatile main memory is used, it is not necessary to consider the life span of a batter for a main memory when the system is in a sleep state. In this embodiment, it is possible to reduce the number of parts and thus reduce manufacturing costs. This embodiment can easily adapt to a multi-processor environment. In this embodiment, times of installation are reduced, and it is possible to remove process migration.

In this embodiment, the integrated memory management device 24 performs optimal wear-leveling on the basis of the read/write frequency information items E1 and E2 peculiar to data, the memory usage information 40, and the memory peculiarity information 41. In this embodiment, the wear-leveling is performed on the basis of the read/write frequency information items E1 and E2 peculiar to data, which makes it possible to perform wear-leveling more efficiently than SSD.

In general, when the generations of the NAND type flash memories are different from each other, the NAND type flash memories have different page sizes and block sizes. In this embodiment, the integrated memory management device 24 reads out the memory peculiarity information 41 from the NAND type flash main memory 26, and performs a process corresponding to the page size or block size indicated by the memory peculiarity information 41. In this way, it is possible to use various generations of NAND type flash memories as the NAND type flash main memory 26. In this embodiment, the integrated memory management device 24 can read out the memory peculiarity information 41 including a page size or a block size from the NAND type flash main memory 26, and match the page size or block size of the NAND type flash main memory 26 with the cache line size of each processor.

In this embodiment, the integrated memory management device 24 manages the life span of the NAND type flash main memory 26, and gives an alarm. In this way, it is possible to prevent the occurrence of defects.

In this embodiment, the integrated memory management device 24 has an RAID function for a plurality of NAND type flash main memories 26. Therefore, it is possible to hot-swap the NAND type flash main memory 26 to be replaced. In this way, it is possible to easily replace an exhausted NAND type flash main memory 26.

Next, an example of the virtual memory access when a plurality of NAND type flash main memories are provided for a plurality of processors will be described.

FIG. 25 is a block diagram illustrating an example of a process of obtaining a pointer for a large address space.

A pointer 53 includes a pointer 53a for a small address space and a pointer 53b for a small address space.

A segment table 54 is provided for each process ID 55, and includes a pointer 56 for a large address space.

A pointer 57 for a large address space is obtained by combining the pointer 53b for a small address space with the pointer 56 for a large address space on the segment table 54 that is specified by the pointer 53a for a small address space.

FIG. 26 is a block diagram illustrating an example of the virtual memory space formed between a plurality of cache memories and a plurality of NAND type flash main memories.

The pointer 57 for a large address space indicates any portion of a virtual memory space 60 formed by cache memories 581 to 58n of a processor and a plurality of NAND type flash main memories 591 to 59m.

In this way, it is possible to collectively deal with the cache memories 581 to 58n of a processor and the plurality of NAND type flash main memories 591 to 59m.

In each of the above-described embodiments, non-volatile memories other than the NAND type flash memory may be used as the main memory.

The integrated memory management devices of the above-described embodiments can use for both a write back type cache and write through type cache.

What is claimed is:

1. A memory management device connectable to a non-volatile memory and a processor comprising:
   an address conversion unit converting logical addresses from the processor into physical addresses of the non-volatile memory; and
   an access unit reading data from memory areas of the non-volatile memory designated by physical addresses at reading, and writing data to memory areas of the non-volatile memory designated by physical addresses at writing,
   wherein the non-volatile memory includes at least two regions and the access unit determines which region to write writing data based on access frequency information associated with the writing data, and the access frequency information is determined based on a predetermined value set according to a characteristic of the writing data.

2. The device according to claim 1, wherein the access frequency information associated with the writing data is determined based on whether the writing data is a part of cache information of web browser information.

3. The device according to claim 1, wherein the access frequency information associated with the writing data is determined based on a predetermined access pattern associated with the writing data.

4. A memory system connectable to a processor comprising:
   a non-volatile memory;
   a memory management device configured to manage the non-volatile memory, comprising,
   an address conversion unit converting logical addresses from the processor into physical addresses of the non-volatile memory; and
   an access unit reading data from memory areas of the non-volatile memory designated by physical addresses at reading, and writing data to memory areas of the non-volatile memory designated by physical addresses at writing,
   wherein the non-volatile memory includes at least two regions, and the access unit determines which region to write writing data based on access frequency information associated with the writing data, and the access frequency information is determined based on a predetermined value set according to a characteristic of the writing data.

5. The memory system according to claim 4, wherein the access frequency information associated with the writing data is determined based on whether the writing data is a part of cache information of web browser information.

6. The memory system according to claim 4, wherein the access frequency information associated with the writing data is determined based on a predetermined access pattern associated with the writing data.

* * * * *